United States Patent
Li et al.

(10) Patent No.: US 11,894,995 B2
(45) Date of Patent: Feb. 6, 2024

(54) DATA PROCESSING METHOD AND APPARATUS

(71) Applicant: HUAWEI TECHNOLOGIES CO., LTD., Guangdong (CN)

(72) Inventors: Mingdong Li, Shanghai (CN); Yaoguang Wang, Shanghai (CN); Enbo Wang, Shanghai (CN); Longyu Cao, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/715,762

(22) Filed: Apr. 7, 2022

(65) Prior Publication Data
US 2022/0231929 A1    Jul. 21, 2022

Related U.S. Application Data

(63) Continuation of application No. PCT/CN2020/120318, filed on Oct. 12, 2020.

(30) Foreign Application Priority Data

Oct. 12, 2019    (CN) .......................... 201910969633.6

(51) Int. Cl.
*H04L 12/00*    (2006.01)
*H04L 43/04*    (2022.01)
(Continued)

(52) U.S. Cl.
CPC ............ *H04L 43/04* (2013.01); *G06F 16/258* (2019.01); *H04L 41/069* (2013.01)

(58) Field of Classification Search
CPC ... G06F 16/258; H04L 41/069; H04L 41/022; H04L 41/0226; H04L 41/0806;
(Continued)

(56) References Cited

U.S. PATENT DOCUMENTS 6,934,749 B1 * 8/2005 Black ...................... H04L 69/18
709/224
7,328,260 B1 * 2/2008 Muthiyan ............... H04L 41/12
711/170
(Continued)

FOREIGN PATENT DOCUMENTS

CN        1649343 A      8/2005
CN      101989928 A      3/2011
(Continued)

OTHER PUBLICATIONS

Extended European Search Report in European Appln No. 20873754.4, dated Oct. 31, 2022, 9 pages.
(Continued)

*Primary Examiner* — Frantz Coby
(74) *Attorney, Agent, or Firm* — Fish & Richardson P.C.

(57) ABSTRACT

Example data processing methods and apparatus are described. One example data processing method includes receiving data description information and reported data, where the data description information includes at least one of a vendor name, network element version information, a data type supported by a network management system, or a coding mode supported by the network management system. The reported data is converted based on the data description information, where reported data obtained through conversion meets a virtual network function event streaming (VES) specification. A VES event is sent, where the VES event includes the reported data obtained through conversion.

14 Claims, 15 Drawing Sheets

(51) Int. Cl.
*G06F 16/25* (2019.01)
*H04L 41/069* (2022.01)

(58) Field of Classification Search
CPC ....... H04L 41/342; H04L 43/06; H04L 43/20; H04L 67/565; H04L 41/40; H04L 43/065; H04L 69/24
USPC .................................................. 709/223–225
See application file for complete search history.

(56) References Cited

U.S. PATENT DOCUMENTS

| | | | |
|---|---|---|---|
| 7,447,790 B2 * | 11/2008 | Motoyama | H04N 1/33376 370/467 |
| 7,895,321 B2 * | 2/2011 | Motoyama | H04L 43/0817 709/224 |
| 8,019,849 B1 * | 9/2011 | Lopilato | G06F 16/1827 709/224 |
| 8,289,873 B2 * | 10/2012 | Stamler | G06Q 10/087 370/252 |
| 9,059,939 B2 * | 6/2015 | Garimella | H04L 41/5054 |
| 10,911,344 B1 * | 2/2021 | Ganjam | H04N 21/44204 |
| 2008/0059623 A1 | 3/2008 | Yang et al. | |
| 2016/0085641 A1 | 3/2016 | Nagasubramaniam et al. | |
| 2017/0149640 A1 | 5/2017 | Narayanan et al. | |
| 2018/0066962 A1 | 3/2018 | Yang et al. | |
| 2018/0159836 A1 | 6/2018 | Wakai | |
| 2020/0076835 A1 * | 3/2020 | Ladnai | G06F 16/955 |
| 2022/0231929 A1 * | 7/2022 | Li | H04L 43/20 |

FOREIGN PATENT DOCUMENTS

| | | |
|---|---|---|
| CN | 103684822 A | 3/2014 |
| CN | 106452839 A | 2/2017 |
| CN | 107800554 A | 3/2018 |
| CN | 108200190 A | 6/2018 |
| CN | 108762768 A | 11/2018 |
| CN | 109274513 A | 1/2019 |
| JP | 2011205327 A | 10/2011 |
| KR | 20090091885 A | 8/2009 |
| KR | 20180055645 A | 5/2018 |

OTHER PUBLICATIONS

Office Action issued in Indian Application No. 202247022495 dated Aug. 17, 2022, 8 pages.
Office Action issued in Chinese Application No. 2019109699633.6 dated May 23, 2022, 6 pages.
3GPP TR 28.890 V2.0.0 (Mar. 2019), "3rd Generation Partnership Project; Technical Specification Group Services and System Aspects; Management and orchestration; Study on integration of Open Network Automation Platform (ONAP) and 3GPP management for 5G networks (Release 16)," Mar. 2019, 45 pages.
Office Action issued in Chinese Application No. 201910969633.6 dated Aug. 4, 2021, 17 pages (with English translation).
PCT International Search Report and Written Opinion issued in International Application No. PCT/CN2020/120318 dated Dec. 31, 2020, 13 pages (with English translation).
SA5, "Presentation of Report to TSG:TR 28.890, Version 2.0.0," 3GPP TSG-SA Meeting #83, SP-190136, Shenzhen, China, Mar. 20-22, 2019, 2 pages.
Office Action in Japanese Appln. No. 2022-521699, dated Jun. 13, 2023, 6 pages (with English translation).
Office Action in Korean Appln. No. 10-2022-7015965, dated Aug. 30, 2023, 19 pages (with English translation).

* cited by examiner

DATA PROCESSING METHOD AND APPARATUS

CROSS-REFERENCE TO RELATED APPLICATIONS

This application is a continuation of International Patent Application No. PCT/CN2020/120318, filed on Oct. 12, 2020, which claims priority to Chinese Patent Application No. 201910969633.6, filed on Oct. 12, 2019. The disclosures of the aforementioned applications are hereby incorporated by reference in their entireties.

TECHNICAL FIELD

This application relates to communication technologies, and in particular, to a data processing method and apparatus.

BACKGROUND

An open network automation platform (Open Network Automation Platform. ONAP) provides a real-time and policy-driven integrated orchestration automation platform for physical/virtual network functions, so that software, network, IT, cloud service providers and developers can quickly and automatically deploy new services through the ONAP, and support lifecycle management.

The ONAP supports operation and maintenance management of physical/virtual network functions of different vendors. The ONAP is deployed between a network management system (Network Management System, NMS) and an element management system (Element Management System, EMS)/network element (Network Element, NE), which is an optional deployment manner. A software defined network controller (Software Defined Network controller, SDNC) in the ONAP collects fault or performance data through an EMS/NE northbound management interface (createMeasurementJob and getAlarmList), and transmits the collected fault or performance data to an ONAP data consumer (Consumer). The ONAP consumer may be an NMS, an ONAP big data analytics engine, or another data consumer.

The fault or performance data transmitted to the ONAP consumer is reported data of different vendors, different types of network elements, and different network element versions. Data protocols and data formats of the reported data of different vendors, different types of network elements, and different network element versions vary greatly. As a result, efficiency of analyzing or using the fault or performance data by the ONAP consumer is low.

SUMMARY

This application provides a data processing method and apparatus, to improve efficiency of analyzing or using reported data.

According to a first aspect, this application provides a data processing method. The method includes: receiving data description information and reported data, where the data description information includes at least one of a vendor name, network element version information, a data type supported by a network management system, or a coding mode supported by the network management system; converting the reported data based on the data description information, where reported data obtained through conversion meets a virtual network function event streaming VES specification; and sending a VES event, where the VES event includes the reported data obtained through conversion.

In this implementation, the reported data is converted into the VES event that meets the VES specification based on the received data description information, so that automatic data conversion can be implemented, and a data consumer (for example, an ONAP consumer) module can directly use the reported data obtained through conversion, to improve efficiency of analyzing or using the reported data by the data consumer module.

In a possible design, the data description information and the reported data are from at least one of a collector or a software defined network controller SDNC, and the collector includes at least one of a file collector, a stream collector, a simple network management protocol (Simple Network Management Protocol, SNMP) trap collector, or a VES collector.

In a possible design, the method may further include: receiving a first message sent by the collector, where the first message includes identification information of the collector, a data type supported by the collector, a coding mode supported by the collector, and an address of the collector; and creating a context of the collector based on the first message, where the context includes the identification information of the collector, the data type supported by the collector, the coding mode supported by the collector, and the address of the collector.

In this implementation, after onboarding of the collector, the collector may send the first message, and a data mapping processing function module may create the context of the collector based on the first message, to uniformly manage the collector after onboarding, to facilitate subsequent service capability negotiation between the collector and the SDNC.

In a possible design, the method may further include: sending a sixth message to the collector, where the sixth message includes the identification information and a registration result of the collector.

In a possible design, when the collector is a file collector, a stream collector, or an SNMP trap collector, the converting the reported data based on the data description information includes: determining a corresponding data conversion template based on the data description information, where the data conversion template is configured to convert the reported data into the VES event that complies with the VES specification; and converting the reported data based on the data conversion template.

In a possible design, the method may further include: receiving a seventh message sent by the SDNC, where the seventh message is used to create, update, or delete the data conversion template.

In a possible design, the seventh message includes data template information and at least one of the vendor name, the network element version information, the data type, or the coding mode.

In a possible design, the method may further include: receiving a second message sent by the SDNC, where the second message is used to indicate a data collection requirement; determining, based on the second message and the context, whether the collector that meets the data collection requirement exists; and sending a third message to the SDNC, where the third message is used to indicate information about the collector that meets the data collection requirement.

In a possible design, the second message includes at least one of a reporting method, the data type supported by the network management system, or the coding mode supported by the network management system.

In a possible design, when the collector that meets the data collection requirement is a file collector or a VNF event stream collector, the third message includes the identification information of the collector.

In a possible design, when the collector that meets the data collection requirement is a stream collector or an SNMP trap collector, the third message includes at least one of the identification information of the collector or the address of the collector.

In a possible design, when the collector is a VES collector, the data description information includes the data type, and the performing data conversion on the reported data based on the data description information may include: adding or deleting, based on the data type, an element included in the reported data.

In a possible design, the reported data includes at least one of file data, stream data, fault data, the VES event, or character data.

According to a second aspect, an embodiment of this application provides a data processing method. The method may include: A collector receives data description information; and the collector sends the data description information and reported data to a data mapping processing function module, where the data description information includes at least one of a vendor name, network element version information, a data type supported by a network management system, or a coding mode supported by the network management system.

In a possible design, the method may further include: The collector sends a first message to the data mapping processing function module, where the first message includes identification information of the collector, a data type supported by the collector, a coding mode supported by the collector, and an address of the collector.

In a possible design, the collector is a file collector, the reported data is file data, and that a collector receives data description information includes: The file collector receives a fourth message sent by a software defined network controller SDNC, where the fourth message includes file information and the data description information, and the file information is used to indicate a location of the file data; and the file collector downloads the file data from the corresponding location based on the file information.

In a possible design, the collector is a stream collector, the reported data is stream data, and that a collector receives data description information includes: The stream collector creates a transmission control protocol (Transmission Control Protocol, TCP) connection to a network element or an element management system; and the stream collector receives the stream data and the data description information through the TCP connection.

In a possible design, the collector is an SNMP trap collector, the reported data is character data, and that a collector receives data description information includes: The SNMP trap collector receives a fifth message sent by an SDNC, where the fifth message includes the data description information and management information base (Management Information Base, MIB) data; the SNMP trap collector receives fault data sent by a network element or an element management system; and the SNMP trap collector decodes the fault data into the character data based on the MIB data.

In a possible design, the collector is a VES collector, the reported data is a VES event, and that a collector receives data description information includes: The VES collector receives the VES event and the data description information that are sent by a network element or an element management system, where the data description information includes the data type supported by the network management system.

According to a third aspect, an embodiment of this application provides a data processing method. The method may include: receiving a data collection request message sent by a software defined network controller SDNC, where the data collection request message includes at least one of a reporting method, a collection granularity period, a data type supported by a network management system, or a coding mode supported by the network management system; and collecting reported data based on the data collection request message, for example, at least one of file data, stream data, fault data, a VES event, or character data.

In a possible design, the method may further include: creating a TCP connection to a stream collector; and sending the stream data and data description information to the stream collector through the TCP connection, where the data description information includes at least one of a vendor name, network element version information, the data type supported by the network management system, or the coding mode supported by the network management system.

In a possible design, the method may further include: sending MIB data to the SDNC, where the MIB data is used to decode the fault data.

In a possible design, the method may further include: sending the data type supported by the network management system and the VES event to a VES collector.

According to a fourth aspect, an embodiment of this application provides a data processing method. The method may include: receiving a service request message sent by a network management system, where the service request message includes at least one of a reporting method, a data type supported by the network management system, or a coding mode supported by the network management system; sending a first capability negotiation message to a network element or an element management system, where the first capability negotiation message is used to trigger the network element or the element management system to feed back whether the network element or the element management system supports at least one of the reporting method, the data type, or the coding mode; and sending a data collection request message to the network element or the element management system based on a feedback of the network element or the element management system.

In a possible design, the service request message further includes an object list, the object list is used to indicate at least one network element, and the element management system is configured to manage one or more of the at least one network element.

In a possible design, the service request message further includes an object list, the object list is used to indicate at least one network element, the network element management system is used to manage one or more of the at least one network element, and the method further includes: parsing the object list to obtain identification information: and the sending a first capability negotiation message to a network element or an element management system includes: sending the first capability negotiation message to the network element or the element management system corresponding to the identification information.

According to a fifth aspect, an embodiment of this application provides a data processing method. The method may include: receiving a first capability negotiation message sent by a software defined network controller SDNC, where the first capability negotiation message is used to trigger a network element or an element management system to feed back whether the network element or the element management system supports at least one of a reporting method of a network management system, a data type supported by the network management system, or a coding mode supported by the network management system; and sending a feedback result to the SDNC, where the feedback result is used to indicate whether at least one of the reporting method of the network management system, the data type supported by the network management system, or the coding mode supported by the network management system is supported.

In a possible design, the first capability negotiation message includes the reporting method, the data type, the coding mode, and an object list, where the object list is used to indicate at least one network element, and the element management system is configured to manage one or more of the at least one network element; and the method may further include: parsing the object list to obtain identification information; and obtaining, based on the identification information, whether the network element or the element management system supports the reporting method, and the data type and the coding mode of the network management system.

According to a sixth aspect, an embodiment of this application provides a data processing apparatus, and the apparatus has a function of implementing the method according to the first aspect. The function may be implemented by hardware, or may be implemented by hardware by executing corresponding software. The hardware or software includes one or more modules corresponding to the foregoing function, for example, a transceiver unit or module, or a processing unit or module.

According to a seventh aspect, an embodiment of this application provides a collector, and the collector has a function of implementing the method according to the second aspect. The function may be implemented by hardware, or may be implemented by hardware by executing corresponding software. The hardware or software includes one or more modules corresponding to the foregoing function, for example, a transceiver unit or module, or a processing unit or module.

According to an eighth aspect, an embodiment of this application provides a data processing apparatus, and the data processing apparatus has a function of implementing the method according to the third aspect. The function may be implemented by hardware, or may be implemented by hardware by executing corresponding software. The hardware or software includes one or more modules corresponding to the foregoing function, for example, a transceiver unit or module, or a processing unit or module.

According to a ninth aspect, an embodiment of this application provides a software defined network controller, and the software defined network controller has a function of implementing the method according to the fourth aspect. The function may be implemented by hardware, or may be implemented by hardware by executing corresponding software. The hardware or software includes one or more modules corresponding to the foregoing function, for example, a transceiver unit or module, or a processing unit or module.

According to a tenth aspect, an embodiment of this application provides a data processing apparatus, and the data processing apparatus has a function of implementing the method according to the fifth aspect. The function may be implemented by hardware, or may be implemented by hardware by executing corresponding software. The hardware or software includes one or more modules corresponding to the foregoing function, for example, a transceiver unit or module, or a processing unit or module.

According to an eleventh aspect, this application provides a data processing apparatus. The apparatus includes one or more processors; and a memory, configured to store one or more programs. When the one or more programs are executed by the one or more processors, the one or more processors are enabled to implement the method according to any one of the first aspect or the possible designs of the first aspect, or the one or more processors are enabled to implement the method according to any one of the second aspect or the possible designs of the second aspect, or the one or more processors are enabled to implement the method according to any one of the third aspect or the possible designs of the third aspect, or the one or more processors are enabled to implement the method according to any one of the fourth aspect or the possible designs of the fourth aspect, or the one or more processors are enabled to implement the method according to any one of the fifth aspect or the possible designs of the fifth aspect.

According to a twelfth aspect, this application provides a computer-readable storage medium. The computer-readable storage medium includes a computer program. When the computer program is executed on a computer, the computer is enabled to perform the method according to any one of the first aspect or the possible designs of the first aspect, or the computer is enabled to perform the method according to any one of the second aspect or the possible designs of the second aspect, or the computer is enabled to perform the method according to any one of the third aspect or the possible designs of the third aspect, or the computer is enabled to perform the method according to any one of the fourth aspect or the possible designs of the fourth aspect, or the computer is enabled to perform the method according to any one of the fifth aspect or the possible designs of the fifth aspect.

According to a thirteenth aspect, this application provides a computer program product. The computer program product includes instructions. When the instructions are executed by a computer, the instructions are used to perform the method according to any one of the first aspect or the possible designs of the first aspect, or the instructions are used to perform the method according to any one of the second aspect or the possible designs of the second aspect, or the instructions are used enabled to perform the method according to any one of the third aspect or the possible designs of the third aspect, or the instructions are used to perform the method according to any one of the fourth aspect or the possible designs of the fourth aspect, or the instructions are used to perform the method according to any one of the fifth aspect or the possible designs of the fifth aspect.

According to a fourteenth aspect, this application provides a chip. The chip includes a processor and a memory. The memory is configured to store a computer program. The processor is configured to invoke and run the computer program stored in the memory, to perform the method according to any one of the first aspect or the possible designs of the first aspect, or perform the method according to any one of the second aspect or the possible designs of the second aspect, or perform the method according to any one of the third aspect or the possible designs of the third aspect, or perform the method according to any one of the fourth aspect or the possible designs of the fourth aspect, or perform the method according to any one of the fifth aspect or the possible designs of the fifth aspect.

According to a fifteenth aspect, an embodiment of this application provides a data processing system. The system may include a data mapping processing function module, at least one collector, an SDNC, and a network element or an element management system. The data mapping processing function module may perform the method according to any one of the first aspect or the possible designs of the first aspect, any collector may perform the method according to any one of the second aspect or the possible designs of the second aspect, the network element or the element management system may perform the method according to any one of the third aspect or the fifth aspect or the possible designs of the third aspect or the fifth aspect, and SDNC may perform the method according to any one of the fourth aspect or the possible designs of the fourth aspect.

According to the data processing method and apparatus in this application, the collector sends the data description information and the reported data to the data mapping processing function module, where the data description information may include at least one of the vendor name, the network element version information, the data type supported by the network management system, or the coding mode supported by the network management system. The data mapping processing function module converts the reported data based on the data description information, where the reported data obtained through conversion meets the VES specification. The data mapping processing function module sends the VES event to the data consumer module, where the VES event includes the reported data obtained through conversion. The reported data from different sources (for example, different vendors, different types of network elements, and different network element versions) may be converted into the data that meets the VES specification, so that the data consumer (for example, the ONAP consumer) module can directly use the reported data obtained through conversion, to improve efficiency of analyzing or using the reported data by the data consumer module.

DESCRIPTION OF EMBODIMENTS

The terms "first", "second", and the like in this application are used only for distinguishing and description, and cannot be understood as indicating or implying relative importance, or as indicating or implying a sequence. Moreover, the terms "include". "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices.

It should be understood that, in this application. "at least one piece (item)" means one or more, and "a plurality of" means two or more. The term "and/or" is used to describe an association relationship between associated objects, and indicates that three relationships may exist. For example, "A and/or B" may indicate the following three cases. Only A exists, only B exists, and both A and B exist, where A and B may be singular or plural. The character "/" usually indicates an "or" relationship between the associated objects. "At least one of the following item (piece)" or a similar expression thereof means any combination of the items, including any combination of singular items (pieces) or plural items (pieces). For example, at least one (piece) of a, b, or c may indicate a, b, c, a and b, a and c, b and c, or a, b, and c, where a, b, and c may be singular or plural.

Figure 1:
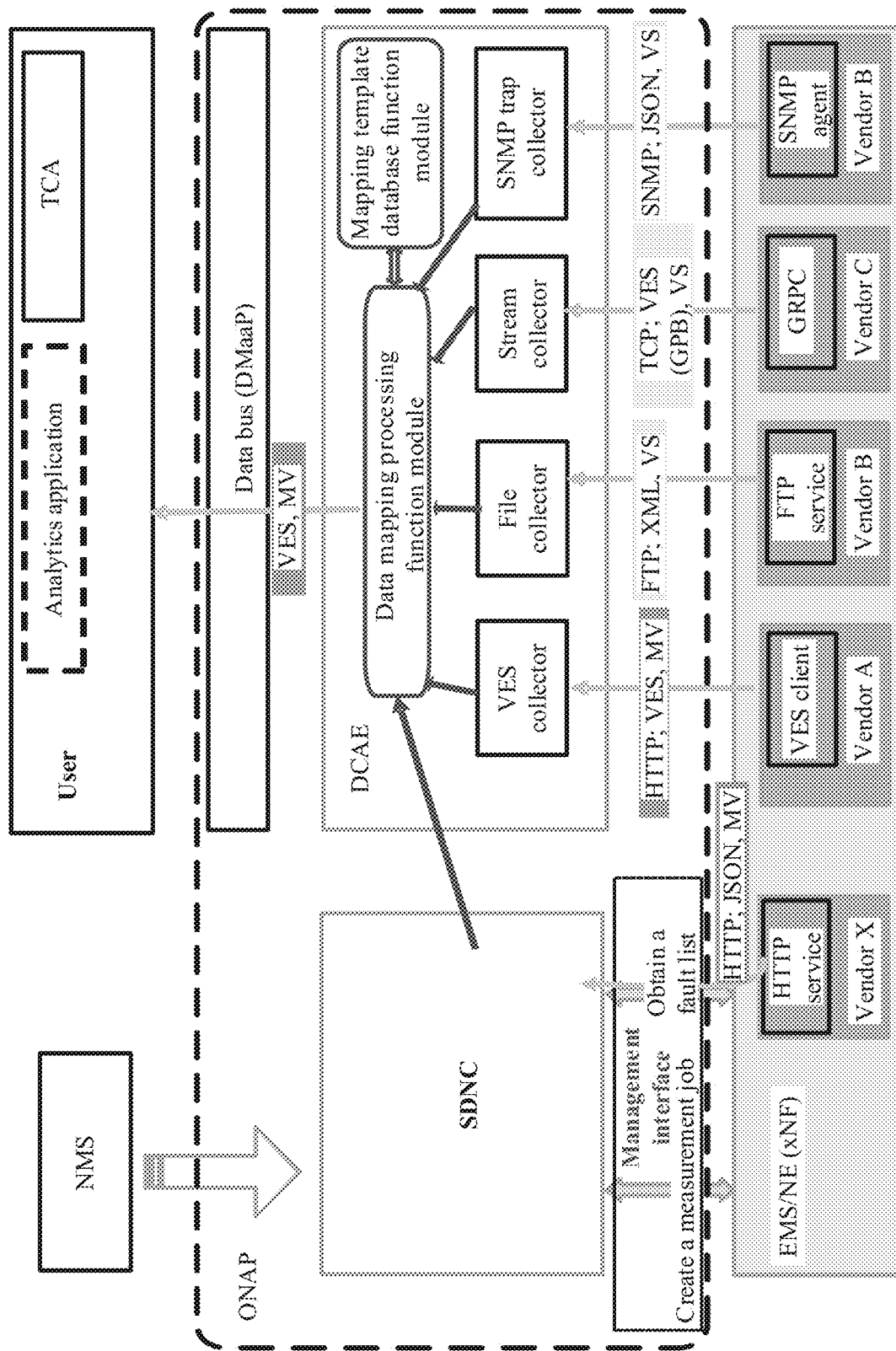
FIG. 1 is a schematic diagram of a system architecture according to an embodiment of this application.

FIG. 1 is a schematic diagram of a system architecture according to an embodiment of this application. As shown in FIG. 1, the system architecture may include an NMS, an ONAP, an EMS/NE, and a consumer (Consumer). The consumer (Consumer) may be an NMS, an analytics application (Analytic Applications), or an electronic computing platform (Electronic Computing Platform, TCA). The ONAP may include an SDNC and a data collection, analytics, and events (Data Collection, Analytics, and Events, DCAE) module. The DCAE module may include a data mapping processing function module (Data Mapper), a mapping template database function module (Mapper catalog), and various types of collectors, such as a VES collector (VES Collector), a file collector (File Collector), a stream collector (Stream Collector), or an SNMP trap collector (SNMP Trap Collector). There is a communication interface between the data mapping processing function module and the various types of collectors. There is a communication interface between the data mapping processing function module and the SDNC. The SDNC collects performance data or fault data through a northbound management interface of the EMS/NE, such as an interface used to create a measurement job (createMeasurementJob) or an interface used to obtain a fault list (getAlarmList).

The foregoing system architecture in embodiments of this application may be applied to various networks implemented by using a network function virtualization (Network Function Virtualization, NFV) technology, for example, a data center network, an operator network, or a local area network, to implement a network service having a specific function. In a process of implementing the network service having a specific function, the network service may be specifically implemented through a plurality of NEs. The NE may be used as a core network element, for example, an MME, or may be used as an access network element, for example, a gNB (gNB) in 5G. Each NE may flexibly deploy computing hardware, storage hardware, and/or network hardware in a sub-hardware resource layer by using one or more virtual network functions (Virtual Network Functions, VNFs). The EMS may manage the plurality of NEs, and each EMS may correspond to a vendor (Vendor). As shown in FIG. 1, EMSs/NEs, of different vendors, that correspond to the ONAP, for example, an HTTP server (HTTP Server) corresponds to a vendor X, a VES client (VES Client) corresponds to a vendor A, a file transfer protocol server (FTP Server) and an SNMP trap agent correspond to a vendor B, and a GRPC corresponds to a vendor C. Data protocols and data formats of reported data of different vendors, different types of network elements, and different network element versions vary greatly. By using the following data processing method in embodiments of this application, efficiency of analyzing or using fault or performance data by an ONAP consumer can be improved. For a specific implementation, refer to explanations and descriptions of the following embodiments.

It should be noted that the data mapping processing function module, the collector, the SDNC, and the like in the system shown in FIG. 1 are only names, and the names constitute no limitation on the function modules. In a 5G network and another future network, entities corresponding to the data mapping processing function module, the collector, and the SDNC may have other names. This is not specifically limited in embodiments of this application.

Figure 2:
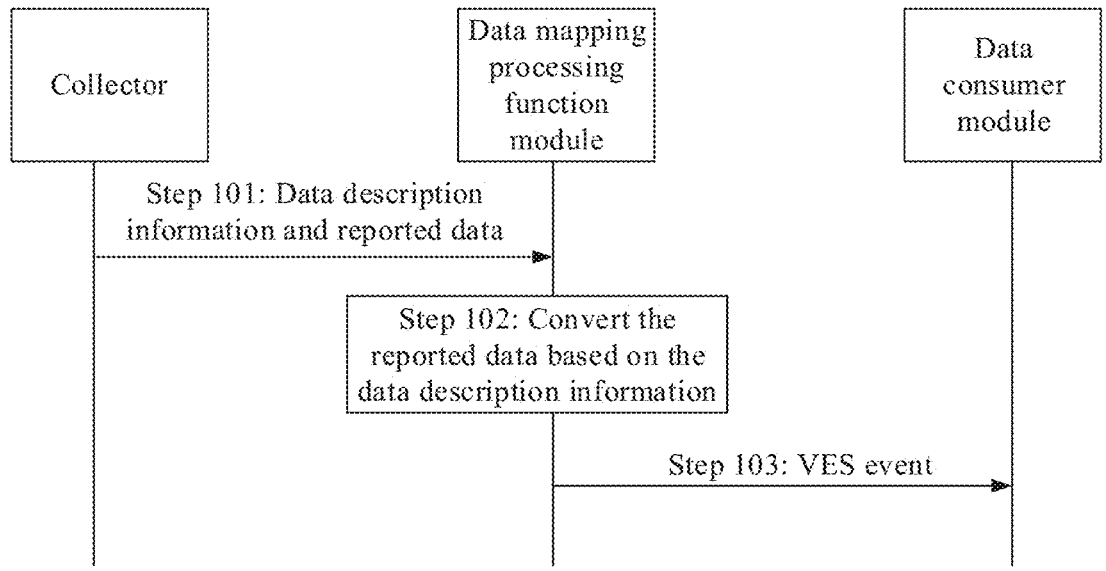
FIG. 2 is a flowchart of a data processing method according to an embodiment of this application.

FIG. 2 is a flowchart of a data processing method according to an embodiment of this application. As shown in FIG. 2, in this embodiment, a data mapping processing function module, a collector, and a data consumer module are provided. The data consumer module may be, for example, an NMS, an analytics application, a TCA, or an ONAP big data analytics engine. The method in this embodiment may include the following steps.

Step 101. The collector sends data description information and reported data to the data mapping processing function module.

Correspondingly, the data mapping processing function module receives the data description information and the reported data that are sent by the collector. The data description information may include at least one of a vendor name (Vendor name), network element version information (NE version), a data type (Domain type) supported by a network management system, or a coding mode (Supported datatype) supported by the network management system.

The vendor name (Vendor name) is used to uniquely identify a vendor, for example, the foregoing vendor A. It may be understood that the vendor name may alternatively be an identity (Identity. ID). For example, the ID of the vendor A is 0000001. The network element version information (NE version) is used to indicate a software version of an NE corresponding to the reported data, and the NE corresponding to the reported data may be an NE that generates the reported data. The data type (Domain type) supported by the network management system indicates a data type supported by the NMS, and the data type supported by the NMS may be a data type carried by the NMS to initiate a creation job, for example, a fault (fault), measurement (measurement), a 3GPP fault (fault3gpp), and 3GPP performance data (perf3gpp). The coding mode (Supported datatype) supported by the network management system indicates a file format/coding mode supported by the NMS, for example, an extensible markup language (Extensible Markup Language, XML), a JavaScript object notation (JavaScript Object Notation, JSON), a yet another markup language (Yet Another Markup Language. YAML), Google protocol buffers (Google Protocol Buffers, GPB), or abstract syntax notation one (Abstract Syntax Notation One, ASN.1).

For example, the collector sends the data description information and the reported data to the data mapping processing function module through a data transmission interface between the collector and the data mapping processing function module, and the data description information and the reported data are from an NE/EMS, for example, from the foregoing FTP server. The NE/EMS may generate the reported data based on a service request message triggered by the NMS, where the service request message may carry the data description information, and report the reported data to the collector. The collector sends the data description information and the reported data to the data mapping processing function module.

Step 102: The data mapping processing function module converts the reported data based on the data description information, where reported data obtained through conversion meets a virtual network function event streaming (VNF Event Streaming. VES) specification.

For example, the reported data is from EMSs/NEs of different vendors, different types of network elements, different network element versions, or different data management fields (for example, performance, a fault, or a log), and data protocols or data formats of the reported data vary greatly. In this embodiment of this application, the data mapping processing function module may convert the reported data, so that the reported data obtained through conversion meets the VES specification, for example, a multi-vendor (Multi-Vendor) VES specification. This specification is a standard specification for a 3GPP data reporting formal.

Step 103: The data mapping processing function module sends a VES event to the data consumer module, where the VES event includes the reported data obtained through conversion.

Through a conversion operation of the data mapping processing function module, the data protocols or the data formats of the reported data sent to the data consumer module may meet a uniform specification. After receiving the reported data obtained through conversion, the data consumer module does not need to perform preprocessing, and can directly use the reported data obtained through conversion, for example, perform data analysis and summarization.

In this embodiment, the collector sends the data description information and the reported data to the data mapping processing function module, where the data description information may include at least one of the vendor name, the network element version information, the data type supported by the network management system, or the coding mode supported by the network management system. The data mapping processing function module converts the reported data based on the data description information, where the reported data obtained through conversion meets the VES specification. The data mapping processing function module sends the VES event to the data consumer module, where the VES event includes the reported data obtained through conversion. The reported data from different sources (for example, different vendors, different types of network elements, and different network element versions) may be converted into the data that meets the VES specification, so that the data consumer (for example, an ONAP consumer) module can directly use the reported data obtained through conversion, to improve efficiency of analyzing or using the reported data by the data consumer module.

An implementation of step 102 in this embodiment of this application is as follows: The data mapping processing function module determines a corresponding data conversion template based on the data description information, and the data mapping processing function module converts the reported data based on the data conversion template, where the reported data obtained through conversion meets the virtual network function event streaming (VNF Event Streaming, VES) specification. The data conversion template may be a parameter conversion rule, for example, a mapping relationship. For example, a parameter A corresponds to a parameter A', to be specific, the parameter A in the reported data is converted into the parameter A' based on the data conversion template.

The data mapping processing function module may be stored in the mapping template database function module (Mapper catalog) in FIG. 1. The mapping template database function module (Mapper catalog) may be co-disposed with the data mapping processing function module (Data Mapper), or may be separately disposed from the data mapping processing function module (Data Mapper). In this embodiment of this application, separate disposing is used as an example for description, and this is not limited thereto. For example, the data mapping processing function module may send the data description information to the mapping template database function module. The mapping template database function module obtains the corresponding data conversion template based on the data description information, and sends the data conversion template to the data mapping processing function module. The data mapping processing function module converts the reported data based on the data conversion template, so that the reported data obtained through conversion complies with the VES specification.

Figure 3:
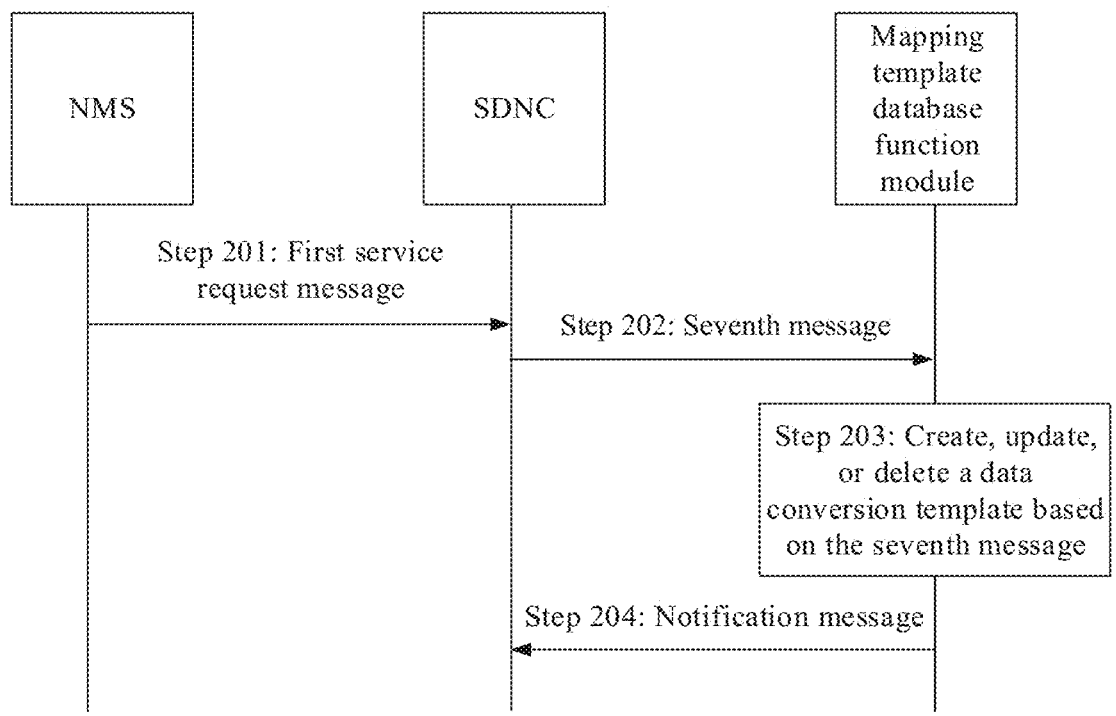
FIG. 3 is a flowchart of a data processing method according to an embodiment of this application.

Onboarding/update/deletion of the data conversion template in the mapping template database function module (Mapper catalog) may be performed by using a method in an embodiment shown in FIG. 3. For specific explanations and descriptions, refer to the following embodiment.

FIG. 3 is a flowchart of a data processing method according to an embodiment of this application. As shown in FIG. 3, in this embodiment, an NMS, an SDNC, and a mapping template database function module (Mapper catalog) are provided. The method in this embodiment may include the following steps.

Step 201: The NMS sends a first service request message to the SDNC, where the first service request message is used to create, update, or delete a data conversion template.

Correspondingly, the NMS receives the first service request message sent by the SDNC. For example, the first service request message may carry a parameter list (Parameterlist), for example, corresponding data template information (templateinfo) and at least one of a vendor name (Vendor name), network element version information (NE version), a data type (Domain type), or a coding mode (Supported datatype), where the data template information (templateinfo) is used to indicate the data conversion template. The first service request message may further carry type indication information, and the type indication information may be two bits. For example, 00 is used to indicate to create the data conversion template, 01 is used to indicate to update the data conversion template, and 10 is used to indicate to delete the data conversion template.

Step 202: The SDNC sends a seventh message to the mapping template database function module (Mapper catalog), where the seventh message is used to create, update, or delete the data conversion template.

The corresponding mapping template database function module (Mapper catalog) receives the seventh message sent by the SDNC. For example, the seventh message may carry various items of information carried in the first service request message, for example, the corresponding data template information (templateinfo) and at least one of the vendor name (Vendor name), the network element version information (NE version), the data type (Domain type), or the coding mode (Supported datatype).

Step 203: The mapping template database function module (Mapper catalog) creates, updates, or deletes the data conversion template based on the seventh message.

For example, when the seventh message is used to create the data conversion template, the mapping template database function module (Mapper catalog) may create a correspondence between the data conversion template and at least one of the vendor name (Vendor name), the network element version information (NE version), the data type (Domain type), or the coding mode (Supported datatype) based on the seventh message. When the seventh message is used to update the data conversion template, the mapping template database function module (Mapper catalog) may create at least one of the vendor name (Vendor name), the network element version information (NE version), the data type (Domain type), or the coding mode (Supported datatype) based on the seventh message, search for a corresponding data conversion template through matching, and update the matched data conversion template by using the data conversion template indicated by the seventh message. When the seventh message is used to delete the data conversion template, the mapping template database function module (Mapper catalog) may create at least one of the vendor name (Vendor name), the network element version information (NE version), the data type (Domain type), or the coding mode (Supported datatype) based on the seventh message, search for a corresponding data conversion template through matching, and delete the corresponding data conversion template.

The data type may be a fault (fault), measurement (measurement), a 3GPP fault (fault3gpp), 3GPP performance data (perf3gpp), or the like. The coding mode (Supported datatype) may be an extensible markup language (Extensible Markup Language, XML), a JavaScript object notation (JavaScript Object Notation, JSON), a yet another markup language (Yet Another Markup Language, YAML), Google protocol buffers (Google Protocol Buffers, GPB), abstract syntax notation one (Abstract Syntax Notation One, ASN.1), or the like.

Step 204: The mapping template database function module (Mapper catalog) sends a notification message to the SDNC, where the notification message is used to indicate a result of creating, updating, or deleting the data conversion template.

Correspondingly, the SDNC receives the notification message sent by the mapping template database function module (Mapper catalog). The notification message may be used to indicate that the data conversion template is successfully created, updated, or deleted, or may be used to indicate that the data conversion template is unsuccessfully created, updated, or deleted.

In this embodiment, the NMS sends the first service request message to the SDNC, where the first service request message is used to create, update, or delete the data conversion template. The SDNC sends the seventh message to the mapping template database function module (Mapper catalog), where the seventh message is used to create, update, or delete the data conversion template. The mapping template database function module (Mapper catalog) creates, updates, or deletes the data conversion template based on the seventh message. The mapping template database function module (Mapper catalog) sends the notification message to the SDNC, where the notification message is used to indicate the result of creating, updating, or deleting the data conversion template, to implement creation, update, or deletion of the data conversion template. Based on different data conversion templates, the reported data from different sources (for example, different vendors, different types of network elements, and different network element versions) may be converted into the data that meets the VES specification, so that a data consumer (for example, an ONAP consumer) module can directly use the reported data obtained through conversion, to improve efficiency of analyzing or using the reported data by the data consumer module.

As shown in FIG. 1, there are a plurality of types of collectors in embodiments of this application, for example, a VES collector (VES Collector), a file collector (File Collector), a stream collector (Stream Collector), or an SNMP trap collector (SNMP Trap Collector), and different collectors support different network protocols and/or coding modes. Therefore, after each collector is successfully deployed (deploy), the collector needs to send attribute capability information of the collector to a data mapping processing function module, and the data mapping processing function module uniformly manages all collectors. For example, the attribute capability information may be identification information of the collector (for example, a collector name (Collector name)), a data type (Domain type) supported by the collector, a coding mode (Supporteddatatype) supported by the collector, and an address (Target address) of the collector. When the SDNC performs collector capability negotiation with the data mapping processing function module, the data mapping processing function module may feed back a result to the SDNC based on the attribute capability information of the collector. When offboarding of the collector is performed, the attribute capability information of the collector in the data mapping processing function module may also be deleted by using a related process.

An example in which a data mapping processing function module manages a collector after onboarding is used for description. For a specific implementation of the data mapping processing function module, refer to explanations and descriptions in the following embodiment.

Figure 4:
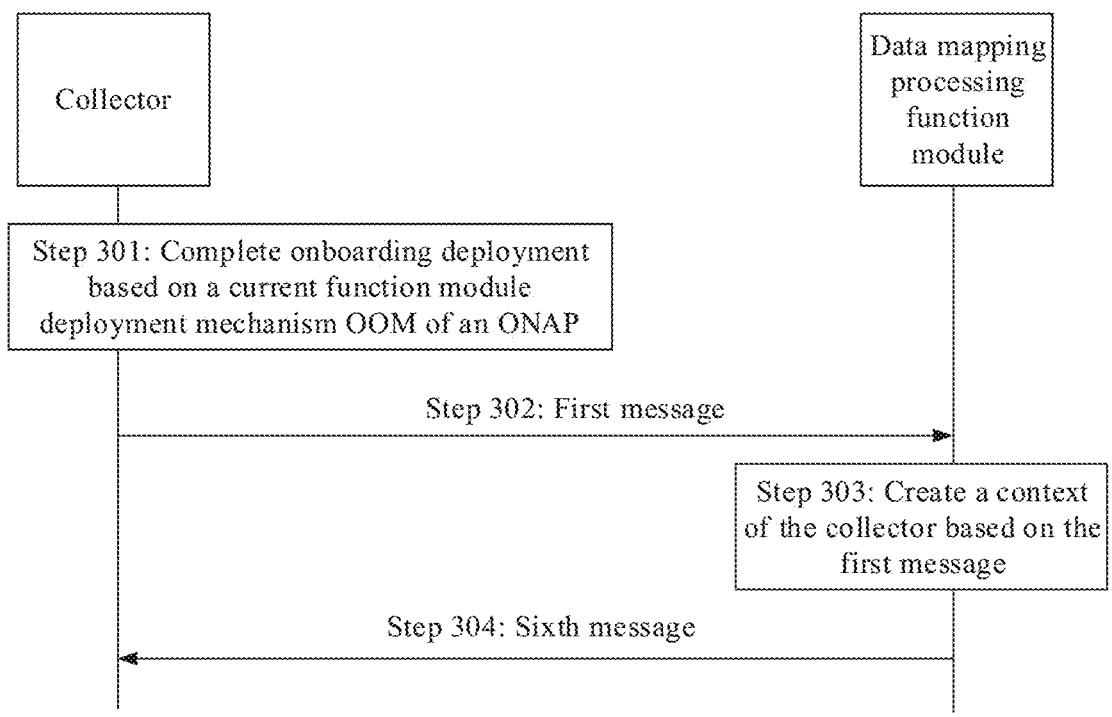
FIG. 4 is a flowchart of a data processing method according to an embodiment of this application.

FIG. 4 is a flowchart of a data processing method according to an embodiment of this application. As shown in FIG. 4, in this embodiment, a collector and a data mapping processing function module are provided. The collector may be a VES collector (VES Collector), a file collector (File Collector), a stream collector (Stream Collector), or an SNMP trap collector (SNMP Trap Collector). The method in this embodiment may include the following steps.

Step 301: The collector completes onboarding deployment based on a current function module deployment mechanism OOM of an ONAP.

Step 302: The collector sends a first message to the data mapping processing function module.

Correspondingly, the data mapping processing function module receives the first message sent by the collector. The first message is used to notify that onboarding of the collector succeeds. For example, the first message may include attribute capability information of the collector, and the attribute capability information may include identification information of the collector, a data type supported by the collector, a coding mode supported by the collector, and an address of the collector.

The data mapping processing function module may be a data mapping processing function module that is configured in the collector and that manages the collector. For example, when the collector is deployed, information about the data mapping processing function module that manages the collector is configured in the collector. The information about the data mapping processing function module may be an IP address (Data Mapper IP address) or the like of the data mapping processing function module. After onboarding of the collector, the collector may send the first message to the data mapping processing function module identified by the IP address.

It should be noted that the first message may also use another message name, for example, a collector registration request message (Collector register request). The message name of the first message is not limited thereto.

Step 303: The data mapping processing function module creates a context of the collector based on the first message.

The context may include the attribute capability information such as the identification information of the collector, the data type supported by the collector, the coding mode supported by the collector, and the address of the collector.

Step 304: The data mapping processing function module sends a sixth message to the collector.

Correspondingly, the collector receives the sixth message sent by the data mapping processing function module, where the sixth message may include the identification information and a registration result of the collector, or may include a registration result of the collector. For example, the registration result may be registration acceptance (Registration-accept), registration rejection (Registration-reject), an error (Error), or the like. For example, after successfully creating the context for the collector by using step 303, the data conversion template may send, to the collector, the sixth message indicating to accept registration.

It should be noted that the sixth message may also use another message name, for example, a collector registration response message (Collect register response) or a registration response message. The message name of the sixth message is not limited thereto.

An implementation principle of a deregistration process of offboarding of the collector is similar to a registration process of onboarding of the collector. For example, when offboarding of the collector needs to be performed, the collector sends a collector deregistration request message to the data mapping processing function module, where the collector deregistration request message is used to indicate the data mapping processing function module to delete the context of the collector; and the data mapping processing function module deletes the context of the collector based on the collector deregistration request message, and sends a deregistration response message to the collector. For example, the deregistration response message is used to indicate to accept deregistration.

In this embodiment of this application, when onboarding or offboarding of the collector is performed, the collector sends a corresponding message to the data mapping processing function module, and the data mapping processing function module creates the context or deletes the context based on the message. Therefore, in a dynamic and flexible deployment process of the collector, the data mapping processing function module can timely learn that onboarding of the collector is performed and obtain the attribute capability information of the collector. The data mapping processing function module uniformly manages all collectors, and in a subsequent process of service capability negotiation with the SDNC, can determine data collection and conversion capabilities based on the attribute capability information of each collector, to provide a data collection service that meets a requirement.

An example in which the collector is a file collector (File Collector) is used to describe the data processing method in this embodiment of this application.

Figure 5A:
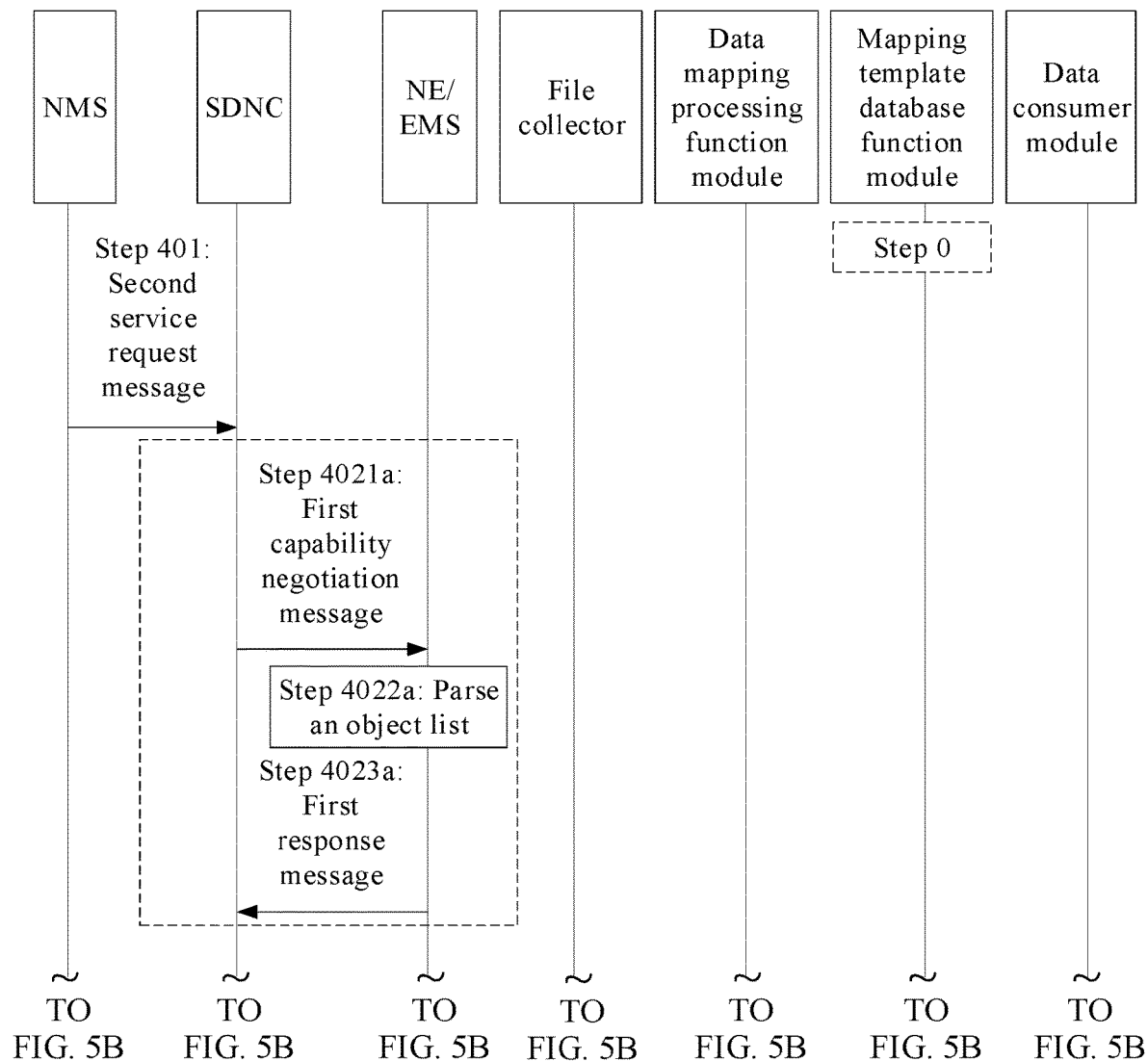
FIG. 5A, FIG. 5B, and FIG. 5C are a flowchart of a data processing method according to an embodiment of this application.
Figure 5B:
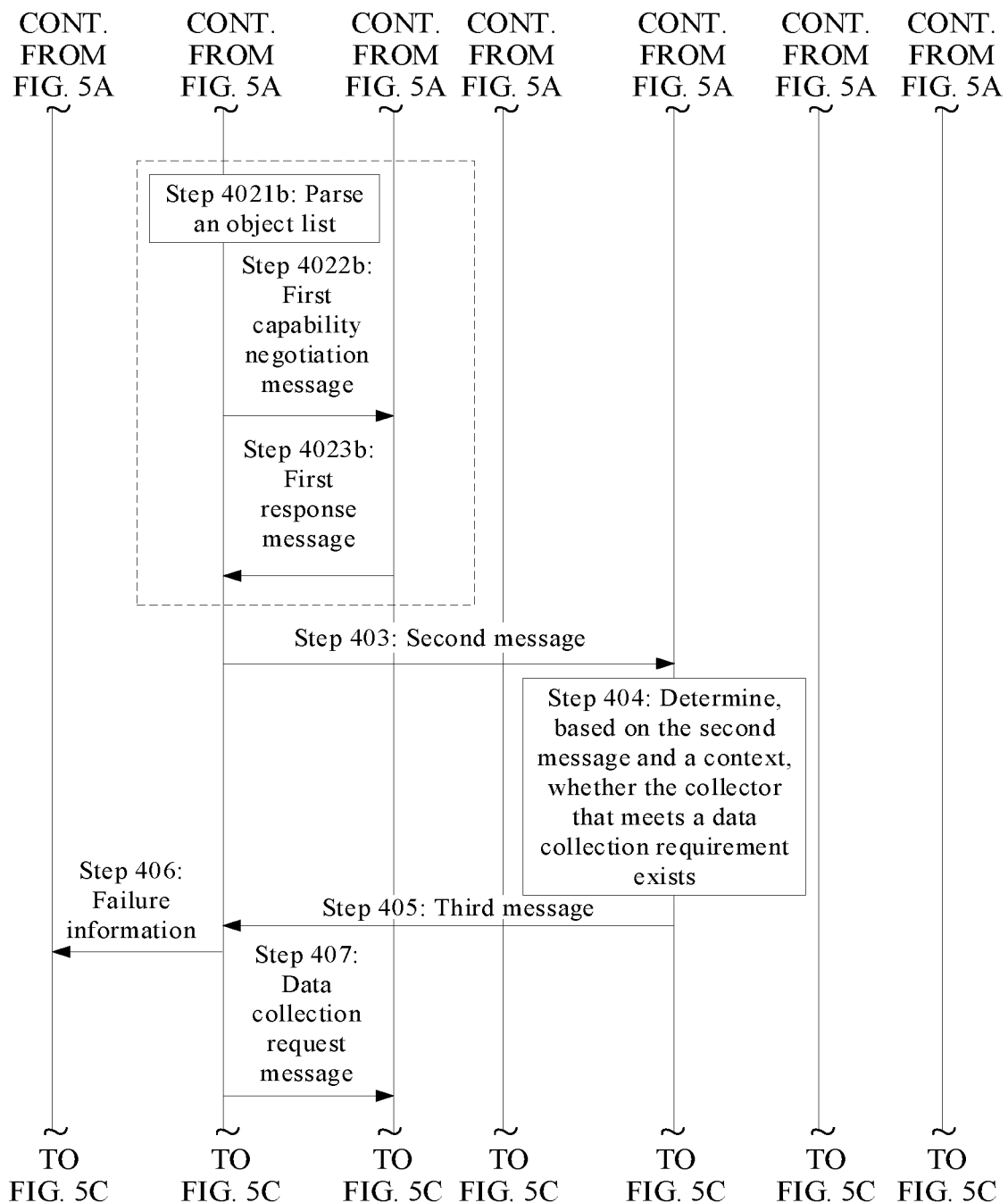
Figure 5C:
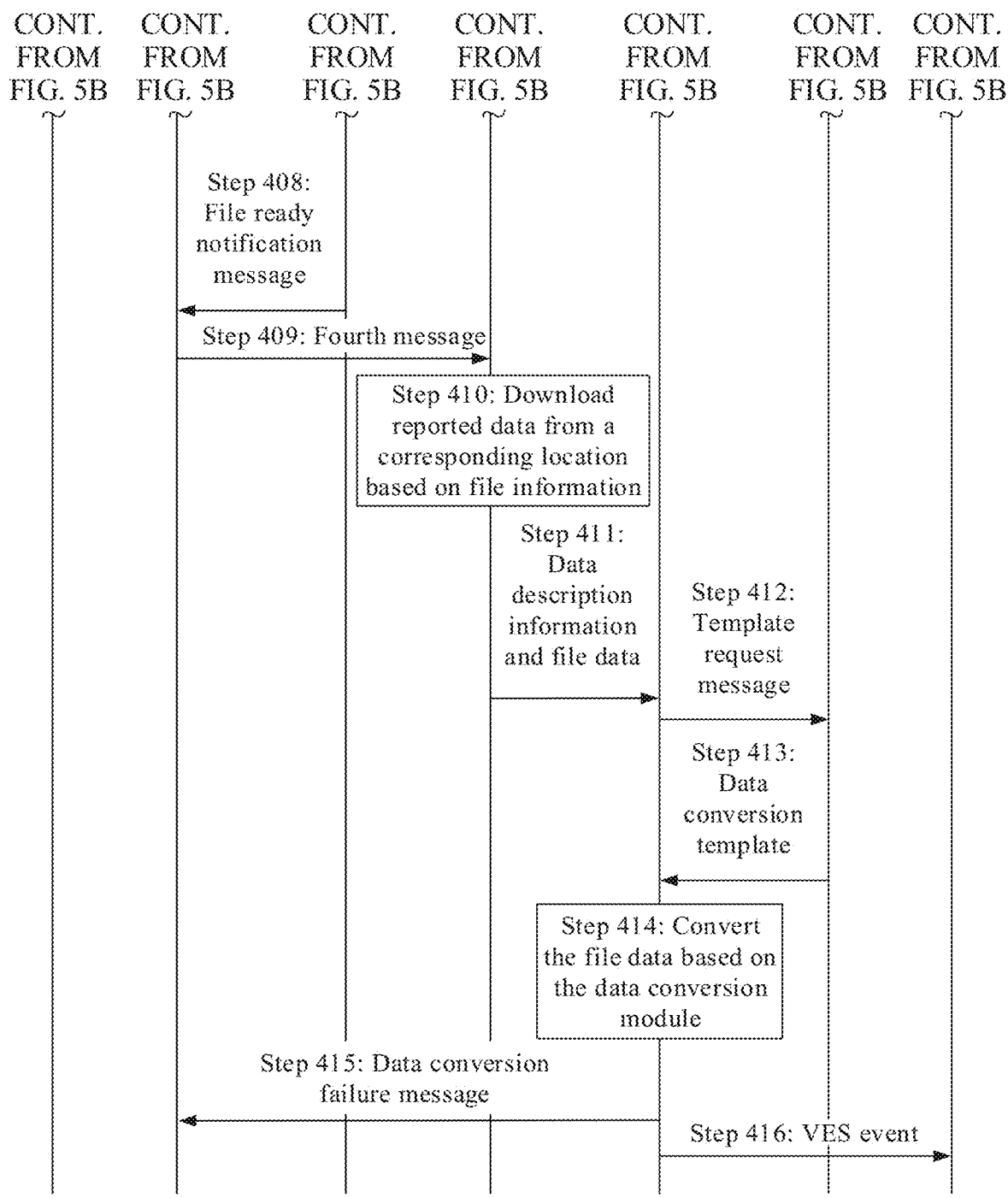

FIG. 5A, FIG. 5B, and FIG. 5C are a flowchart of a data processing method according to an embodiment of this application. As shown in FIG. 5A. FIG. 5B, and FIG. 5C, in this embodiment, an NMS, an SDNC, an EN/EMS, a file collector (File Collector), a data mapping processing function module, and a mapping template database function module (Mapper catalog), and a data consumer module are provided. The method in this embodiment may include the following steps.

Step 401: The NMS sends a second service request message to the SDNC.

Correspondingly, the SDNC receives the second service request message sent by the NMS. The second service request message is used to create a data collection service, so that the collector completes collection of reported data of different transmission protocols and/or data formats, and the data mapping processing function module completes conversion of the reported data from different data sources into data that meets a VES specification.

In some embodiments, the second service request message includes at least one of a reporting method (reportingMethod) supported by the NMS, a data type supported by the NMS, or a coding mode supported by the NMS. The data type supported by the NMS and the coding mode supported by the NMS may be the same as the data type supported by the NMS and the coding mode supported by the NMS in step 101 of the embodiment shown in FIG. 2. For specific explanations and descriptions thereof, refer to the foregoing embodiment. Details are not described herein again. The reporting method supported by the NMS is used to indicate file reporting or stream reporting.

For example, the second service request message may further include an object list, where the object list is used to indicate at least one network element, and the network management system is configured to manage one or more of the at least one network element. For example, the object list includes an object class list (IOC class list) and an object class instance list (IOC instance list), and the object class list may be an information object class (information object class, iOC) object list (InstanceList). The iOC object instance list is used to indicate one or more managed object instances (managed object instances), the one or more managed object instances correspond to one NE, and the EMS may manage one or more NEs.

For example, the reporting method supported by the NMS, the data type supported by the NMS, or the coding mode supported by the NMS may be a reporting method, a data type, or a coding mode supported by the data consumer module.

In some embodiments, before step 401 is performed, a data conversion template may be further stored in the mapping template database function module in an NE onboarding (onboarding) process, for example, step 0 shown in FIG. 5A, FIG. 5B, and FIG. 5C. In step 0, a dashed box indicates that an execution sequence of step 0 is not limited by a sequence number or a location in the figure, and an implementation of step 0 may include the steps in the embodiment shown in FIG. 3. Details are not described herein again.

Step 4021a: The SDNC sends a first capability negotiation message to the NE/EMS.

Correspondingly, the NE/EMS receives the first capability negotiation message sent by the SDNC. The first capability negotiation message is used to trigger the NE/EMS to feed back whether the NE/EMS supports at least one of the reporting method, the data type, or the coding mode carried in the second service request message. That is, the SDNC initiates capability negotiation to the NE/EMS based on the reporting method, the data type, and/or the coding mode in step 401. The first capability negotiation message may include one or more of the data type supported by the NMS, the coding mode supported by the NMS, or the reporting method (reportingMethod) supported by the NMS. In some embodiments, the first capability negotiation message may further include the object class list (IOC class list) and the object class instance list (IOC instance list).

Step 4022a: The NE/EMS parses the object class list (IOC class list) and the object class instance list (IOC instance list), to obtain identification information.

For example, the identification information is an NE ID list, and the NE ID list may include an ID of one or more network elements. The NE/EMS queries, based on the NE ID list, whether a corresponding NE supports one or more of the data reporting method, the data type, or the coding scheme.

Step 4023a: The NE/EMS sends a first response message to the SDNC.

Correspondingly, the SDNC receives the first response message sent by one or more NEs/EMSs. The first response message is used to indicate whether each NE corresponding to the NE ID list supports the data type, the coding mode, and/or the reporting method. For example, the first response message carries an NE ID and acknowledged information, and the acknowledged information is used to indicate an ACK, that is, the NE corresponding to the NE ID supports the data type and the coding mode. When the NE that does not support the data type or the coding mode exists, the first response message may carry an NE ID and unacknowledged information, and the unacknowledged information is used to indicate a NACK. When the NE that does not support the data type or the coding mode exists, step 407 may be performed after step 4023a is performed. When the NE that supports the data type or the coding mode exists, step 408 may be performed after step 4023a is performed.

Step 4021b: The SDNC parses the object class list (IOC class list) and the object class instance list (IOC instance list), to obtain identification information.

For specific explanations and descriptions of the identification information, refer to the explanations and descriptions in step 4022a. Details are not described herein again.

Step 4022b: The SDNC sends a first capability negotiation message to the NE/EMS.

For explanations and descriptions of the first capability negotiation request message, refer to step 4021a. Details are not described herein again. A difference lies in that the first capability negotiation message in step 4022b does not include the object class list (IOC class list) and the object class instance list (IOC instance list), but includes an NE ID list. The NE ID list may include an ID of one or more network elements. The NE/EMS queries, based on the NE ID list, whether a corresponding NE supports the data type, the coding mode, and/or the reporting method.

Step 4023b. The NE/EMS sends a first response message to the SDNC.

For explanations and descriptions of step 4023b, refer to the explanations and descriptions of step 4023a. Details are not described herein again.

In the foregoing step 4021a to step 4023a, or in the foregoing step 4021b to step 4023b, whether the NE/EMS supports the data type and the coding mode in step 401 may be determined. After step 401 is performed, step 4021a to step 4023a may be performed, or step 4021b to step 4023b may be performed. In FIG. 5A, FIG. 5B, and FIG. 5C, a dashed box in step 4021a to step 4023a and a dashed box in step 4021b to step 4023b indicate that the steps are optional.

Step 403: The SDNC sends a second message to the data mapping processing function module.

Correspondingly, the data mapping processing function module receives the second message sent by the SDNC. The second message is used to indicate a data collection requirement.

In some embodiments, the second message may include at least one of the data type, the coding mode, or the reporting method in step 401. The SDNC queries, by using the second message, whether the collector supports a corresponding data type, a coding mode, or a reporting method. The reporting method may be the reporting method (reportingMethod) supported by the NMS, for example, the stream reporting or the file reporting.

Step 404. The data mapping processing function module determines, based on the second message and a context, whether the collector that meets the data collection requirement exists.

The data mapping processing function module queries, based on a locally stored context of each collector, for example, by using the context created in the embodiment shown in FIG. 4, whether a corresponding collector exists, and whether the collector supports the data type and the coding mode.

Step 405: The data mapping processing function module sends a third message to the SDNC.

Correspondingly, the SDNC receives the third message sent by the data mapping processing function module. The third message is used to indicate information about the collector that meets the data collection requirement. For example, the third message may include a target address and a result of the collector, or identification information and a result of the collector, or a destination address, identification information, and a result of the collector, and the result may be used to indicate an acknowledgment (ack) or a negative acknowledgment (nack). When the result indicates the negative acknowledgment (nack), step 406 is performed. When the result indicates the acknowledgment (ack), step 407 may be performed.

Step 406: The SDNC feeds back failure information to the NMS.

Step 407: The SDNC sends a data collection request message to the NE/EMS.

Correspondingly, the NE/EMS receives the data collection request message sent by the SDNC. The data collection request message may include at least one of a reporting method, a collection granularity period (granularityPeriod), the data type supported by the network management system, or the coding mode supported by the network management system.

For performance management, the SDNC creates a performance measurement job, and carries at least one of the reporting method, the collection granularity period (granularityPeriod), the data type supported by the network management system, or the coding mode supported by the network management system. After receiving the job, the NE/EMS returns acknowledged information. For fault management, the SDNC sends a configuration request to the NE/EMS, carries at least one of the reporting method, the collection granularity period (granularityPeriod), the data type supported by the network management system, or the coding mode supported by the network management system, and configures a reporting method for fault data reporting. After receiving the configuration request, the NE/EMS returns acknowledged information.

It should be noted that, the data collection request message may be sent to the NE/EMS that feeds back whether the NE/EMS supports the reporting method, the data type, and/or the coding mode in step 401 by performing step 4021a to step 4023a, or step 4021b to step 4023b.

Step 408: The NE/EMS periodically sends a file ready notification message to the SDNC based on the data collection request message.

The NE/EMS periodically sends the file ready (FileReady) notification message to the SDNC based on the collection granularity period (granularityPeriod). The file ready notification message may carry parameters such as a file information list (FileinfoList), a vendor name (Vendorname), or network element version information (NEversion). The file information list (FileinfoList) may include information such as a file location (fileLocation), a file size (fileSize), file ready time (fileReadyTime), file expiration time (fileExpirationTime), file compression (fileCompression), or a file format (fileFormat).

Step 409: The SDNC sends a fourth message to the file collector.

Correspondingly, the file collector receives the fourth message sent by the SDNC. The fourth message may include file information and data description information. The file information is used to indicate each parameter in step 408. The data description information may include each piece of information described in step 101 in the embodiment shown in FIG. 2. Specific explanations and descriptions are not described herein again.

Step 410: The file collector downloads the reported data from the corresponding location based on the file information.

The reported data is from the NE/EMS. The reported data may be file data.

Step 411: The file collector sends the data description information and the file data to the data mapping processing function module.

Step 412: The data mapping processing function module sends a template request message to the mapping template database function module.

The template request message may carry the data description information.

Step 413. The mapping template database function module matches an appropriate data conversion template based on the data description information, and feeds back a matching result to the data conversion template.

The matching result may include the data conversion template, or is used to indicate information indicating that there is no appropriate data conversion template. For specific explanations and descriptions of the data conversion template, refer to the explanations and descriptions in the embodiment shown in FIG. 3. Details are not described herein again.

Step 414: The data mapping processing function module converts the file data based on the data conversion template, where file data obtained through conversion meets the VES specification.

When the data mapping processing function module receives the data conversion template fed back by the mapping template database function module, the data mapping processing function module converts the file data by using step 414, and then performs the following step 416. When the data mapping processing function module receives a feedback from the mapping template database function module that there is no appropriate data conversion template, the following step 415 is performed to convert the file data.

For explanations and descriptions of the VES specification, refer to step 102 in the embodiment shown in FIG. 2. Details are not described herein again.

Step 415: The data mapping processing function module sends a data conversion failure message to the SDNC. The data conversion failure message is used to indicate that an error occurs in data conversion.

Step 416: The data mapping processing function module sends a VES event to the data consumer module, where the VES event includes the file data obtained through conversion.

In this embodiment, the reported data from different sources (for example, different vendors, different types of network elements, and different network element versions) may be converted into the data that meets the VES specification, so that the data consumer (for example, an ONAP consumer) module can directly use the reported data obtained through conversion, to improve efficiency of analyzing or using the reported data by the data consumer module.

An example in which the collector is a stream collector (Stream Collector) is used to describe the data processing method in this embodiment of this application.

Figure 6:
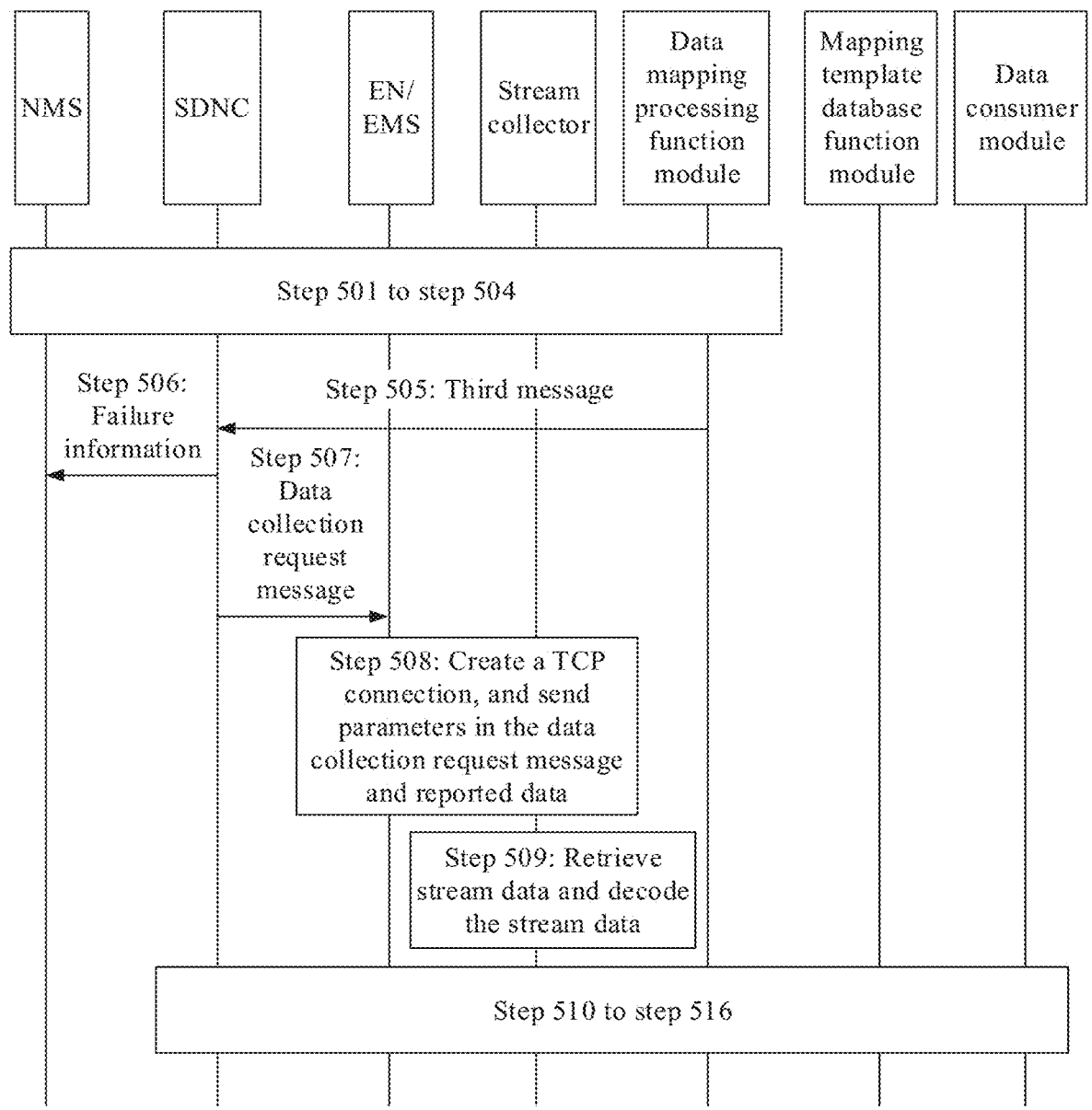
FIG. 6 is a flowchart of a data processing method according to an embodiment of this application.

FIG. 6 is a flowchart of a data processing method according to an embodiment of this application. As shown in FIG. 6, in this embodiment, an NMS, an SDNC, an EN/EMS, a stream collector (Stream Collector), a data mapping processing function module, a mapping template database function module (Mapper catalog), and a data consumer module are provided. The method in this embodiment may include the following steps.

Step 501: The NMS sends a second service request message to the SDNC.

For a specific implementation of step 501, refer to step 401 in the embodiment shown in FIG. 5A, FIG. 5B, and FIG. 5C. Details are not described herein again.

Step 502: Determine whether the NE/EMS supports a data type and a coding mode in step 501.

A specific implementation of step 502 may be implemented by using step 4021a to step 4023a, or step 4021b to step 4023b in the embodiment shown in FIG. 5A, FIG. 5B, and FIG. 5C. Details are not described herein again.

Step 503: The SDNC sends a second message to the data mapping processing function module.

Step 504: The data mapping processing function module determines, based on the second message and a context, whether the collector that meets a data collection requirement exists.

For explanations and descriptions of step 503 and step 504, refer to step 403 and step 404 in the embodiment shown in FIG. 5A, FIG. 5B, and FIG. 5C. Details are not described herein again.

Step 505: The data mapping processing function module sends a third message to the SDNC.

Correspondingly, the SDNC receives the third message sent by the data mapping processing function module. The third message in this embodiment may include a target address and a result of the stream collector. The result may be used to indicate an acknowledgment (ack) or a negative acknowledgment (nack). When the result indicates the negative acknowledgment (nack), step 506 is performed. When the result indicates the acknowledgment (ack), step 507 may be performed. The target address of the stream collector may facilitate creation of a TCP connection between the NE/EMS and the stream collector in the following steps. The target address may be an IP address and port information of the stream collector.

Step 506: The SDNC feeds back failure information to the NMS.

Step 507: The SDNC sends a data collection request message to the NE/EMS.

For explanations and descriptions of step 507, refer to step 407 in the embodiment shown in FIG. 5A, FIG. 5B, and FIG. 5C. Details are not described herein again. The data collection request message further includes the target address of the foregoing stream collector.

Step 508: The NE/EMS creates the TCP connection to the stream collector based on the data collection request message, sends parameters in the data collection request message to the stream collector, and periodically sends reported data based on a collection granularity period (granularityPeriod).

The reported data may be stream data.

Step 509: The stream collector retrieves the stream data and decodes the stream data.

Step 510: The stream collector sends the decoded stream data and data description information to the data mapping processing function module.

Step 512: The data mapping processing function module sends template request information to the mapping template database function module.

Step 513: The mapping template database function module matches an appropriate data conversion template based on the data description information, and feeds back a matching result to the data conversion template.

The matching result may include the data conversion template, or is used to indicate information indicating that there is no appropriate data conversion template. For specific explanations and descriptions of the data conversion template, refer to the explanations and descriptions in the embodiment shown in FIG. 3. Details are not described herein again.

Step 514: The data mapping processing function module converts the stream data based on the data conversion template, where stream data obtained through conversion meets a VES specification.

When the data mapping processing function module receives the data conversion template fed back by the mapping template database function module, the data mapping processing function module converts the stream data by using step 514, and then performs the following step 516. When the data mapping processing function module receives a feedback from the mapping template database function module that there is no appropriate data conversion template, the following step 515 is performed to convert the stream data.

For explanations and descriptions of the VES specification, refer to step 102 in the embodiment shown in FIG. 2. Details are not described herein again.

Step 515: The data mapping processing function module sends a data conversion failure message to the SDNC. The data conversion failure message is used to indicate that an error occurs in data conversion.

Step 516: The data mapping processing function module sends a VES event to the data consumer module, where the VES event includes the stream data obtained through conversion.

In this embodiment, the reported data from different sources (for example, different vendors, different types of network elements, and different network element versions) may be converted into the data that meets the VES specification, so that the data consumer (for example, an ONAP consumer) module can directly use the reported data obtained through conversion, to improve efficiency of analyzing or using the reported data by the data consumer module.

An example in which the collector is an SNMP trap collector (SNMP Trap Collector) is used to describe the data processing method in this embodiment of this application.

Figure 7:
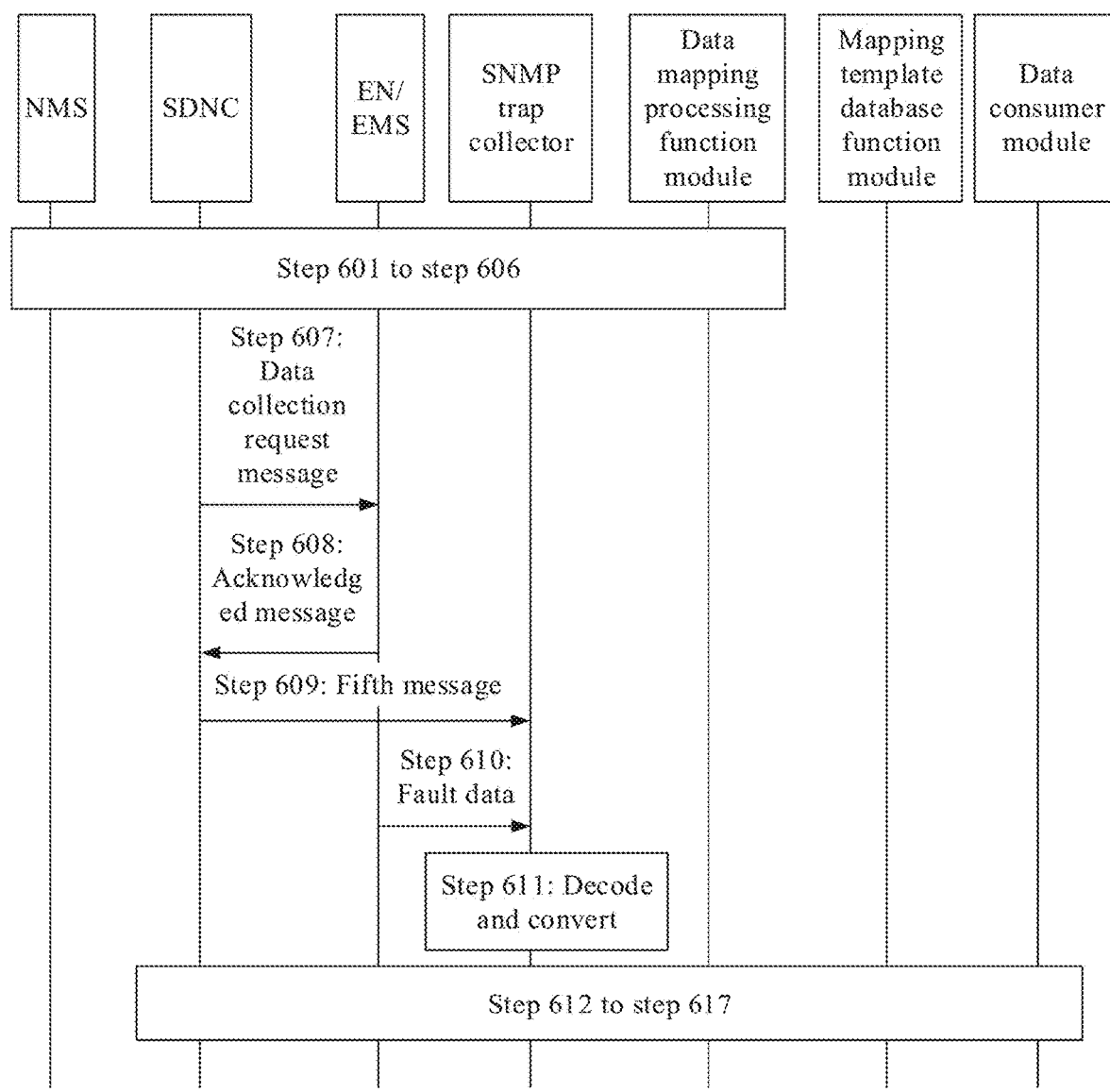
FIG. 7 is a flowchart of a data processing method according to an embodiment of this application.

FIG. 7 is a flowchart of a data processing method according to an embodiment of this application. As shown in FIG. 7, in this embodiment, an NMS, an SDNC, an EN/EMS, an SNMP trap collector (SNMP Trap Collector), a data mapping processing function module, a mapping template database function module (Mapper catalog), and a data consumer module are provided. The method in this embodiment may include the following steps.

Step 601: The NMS sends a second service request message to the SDNC.

For a specific implementation of step 601, refer to step 401 in the embodiment shown in FIG. 5A, FIG. 5B, and FIG. 5C. Details are not described herein again.

Step 602: Determine whether the NE/EMS supports a data type and a coding mode in step 601.

A specific implementation of step 602 may be implemented by using step 4021a to step 4023a, or step 4021b to step 4023b in the embodiment shown in FIG. 5A, FIG. 5B, and FIG. 5C. Details are not described herein again.

Step 603: The SDNC sends a second message to the data mapping processing function module.

Step 604: The data mapping processing function module determines, based on the second message and a context, whether the collector that meets a data collection requirement exists.

Step 605: The data mapping processing function module sends a third message to the SDNC.

Step 606: The SDNC feeds back failure information to the NMS.

Step 607: The SDNC sends a data collection request message to the NE/EMS.

For explanations and descriptions of step 603 to step 607, refer to step 403 to step 407 in the embodiment shown in FIG. 5A, FIG. 5B, and FIG. 5C. Details are not described herein again.

Step 608: The NE/EMS returns an acknowledged message to the SDNC, where the acknowledged message may include data description information, such as a vendor name (Vendorname) or network element version information (NEversion), and MIB data, and the MIB data is used to parse SNMP protocol content.

Step 609: The SDNC sends a fifth message to the SNMP trap collector.

The SNMP trap collector receives the fifth message sent by the SDNC, where the fifth message may include the data description information and the MIB data.

Step 610: When a new fault is generated in the NE/EMS, the NE/EMS triggers a fault trap, and sends fault data to the SNMP trap collector.

Specifically, the NE/EMS may send the fault data to the SNMP trap collector based on a target address in the data collection request message.

Step 611: The SNMP trap collector receives the fault data, decodes SNMP protocol fault data based on the MIB data, and converts OID data into character data.

Step 612: The SNMP trap collector sends the character data and the data description information to the data mapping processing function module.

Step 613: The data mapping processing function module sends template request information to the mapping template database function module.

Step 614: The mapping template database function module matches an appropriate data conversion template based on the data description information, and feeds back a matching result to the data conversion template.

The matching result may include the data conversion template, or is used to indicate information indicating that there is no appropriate data conversion template. For specific explanations and descriptions of the data conversion template, refer to the explanations and descriptions in the embodiment shown in FIG. 3. Details are not described herein again.

Step 615: The data mapping processing function module converts the character data based on the data conversion template, where character data obtained through conversion meets a VES specification.

When the data mapping processing function module receives the data conversion template fed back by the mapping template database function module, the data mapping processing function module converts the character data by using step 615, and then performs the following step 617. When the data mapping processing function module receives a feedback from the mapping template database function module that there is no appropriate data conversion template, the following step 616 is performed to convert the stream data.

For explanations and descriptions of the VES specification, refer to step 102 in the embodiment shown in FIG. 2. Details are not described herein again.

Step 616: The data mapping processing function module sends a data conversion failure message to the SDNC. The data conversion failure message is used to indicate that an error occurs in data conversion.

Step 617; The data mapping processing function module sends a VES event to the data consumer module, where the VES event includes the character data obtained through conversion.

In this embodiment, the reported data from different sources (for example, different vendors, different types of network elements, and different network element versions) may be converted into the data that meets the VES specification, so that the data consumer (for example, an ONAP consumer) module can directly use the reported data obtained through conversion, to improve efficiency of analyzing or using the reported data by the data consumer module.

An example in which the collector is a VES collector (VES Collector) is used to describe the data processing method in this embodiment of this application.

Figure 8:
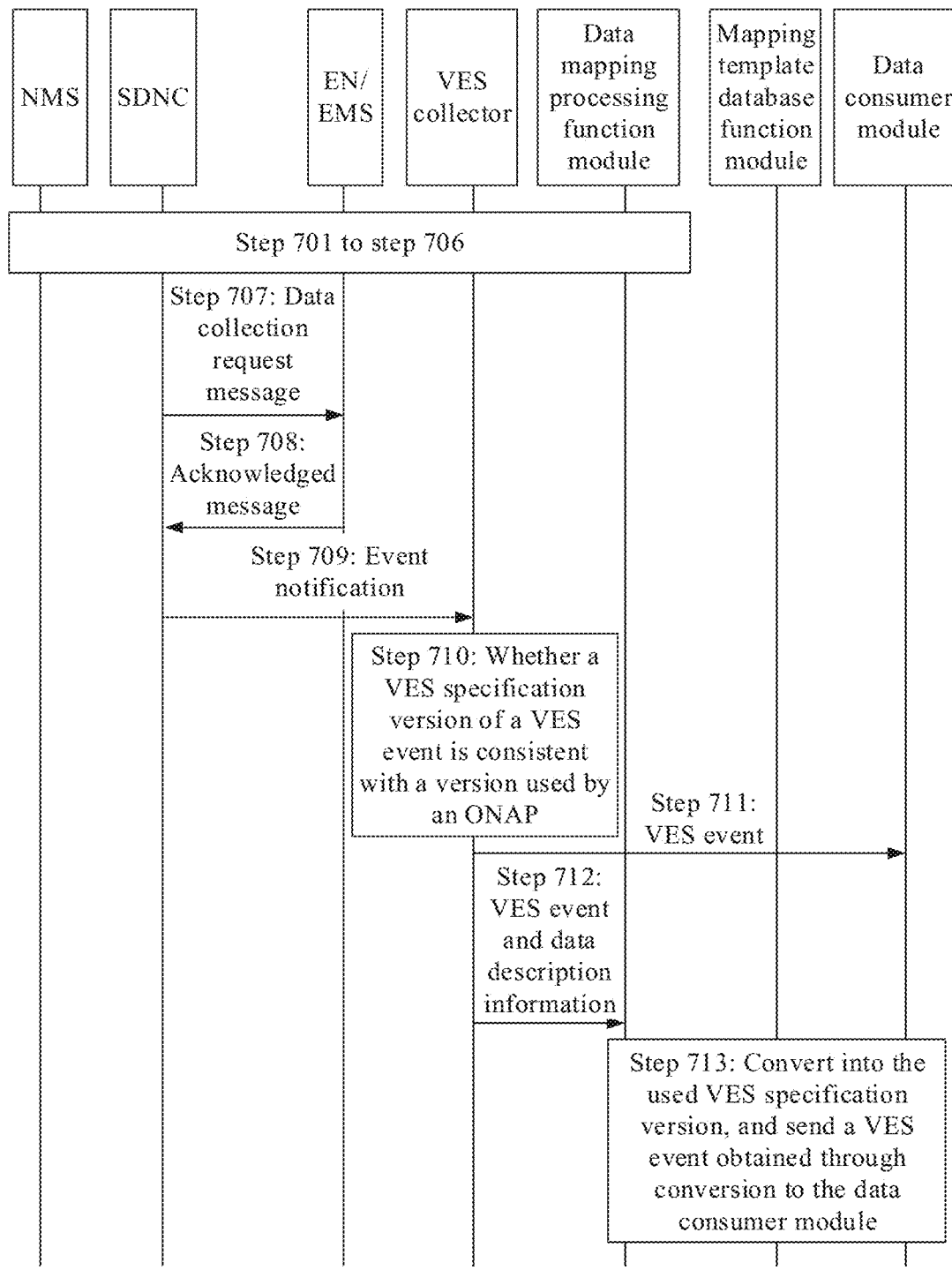
FIG. 8 is a flowchart of a data processing method according to an embodiment of this application.

FIG. 8 is a flowchart of a data processing method according to an embodiment of this application. As shown in FIG. 8, in this embodiment, an NMS, an SDNC, an EN/EMS, a VES collector (VES Collector), a data mapping processing function module, a mapping template database function module (Mapper catalog), and a data consumer module are provided. The method in this embodiment may include the following steps.

Step 701: The NMS sends a second service request message to the SDNC.

For a specific implementation of step 701, refer to step 401 in the embodiment shown in FIG. 5A, FIG. 5B, and FIG. 5C. Details are not described herein again.

Step 702: Determine whether the NE/EMS supports a data type and a coding mode in step 701.

A specific implementation of step 702 may be implemented by using step 4021*a* to step 4023*a*, or step 4021*b* to step 4023*b* in the embodiment shown in FIG. 5A, FIG. 5B, and FIG. 5C. Details are not described herein again.

Step 703: The SDNC sends a second message to the data mapping processing function module.

Step 704: The data mapping processing function module determines, based on the second message and a context, whether the collector that meets a data collection requirement exists.

Step 705: The data mapping processing function module sends a third message to the SDNC.

Step 706: The SDNC feeds back failure information to the NMS.

Step 707: The SDNC sends a data collection request message to the NE/EMS.

For explanations and descriptions of step 703 to step 707, refer to step 403 to step 407 in the embodiment shown in FIG. 5A, FIG. 5B, and FIG. 5C. Details are not described herein again.

Step 708: The NE/EMS returns an acknowledged message to the SDNC.

Step 709: The NE/EMS sends an event notification to the VES collector, where the event notification includes a VES event and data description information.

For example, the data description information includes information such as the data type.

Step 710: The VES collector queries the collected VES event. If a VES specification version of the VES event is consistent with a version used by an ONAP, step 711 is performed. If a VES specification version of the VES event is inconsistent with a version used by an ONAP, step 712 is performed.

Step 711: The VES collector sends the VES event to the data consumer module.

Step 712: The VES collector sends the VES event and the data description information to the data mapping processing function module.

Step 713: The data mapping processing function module converts the VES event into the used VES specification version based on the data description information, and sends a VES event obtained through conversion to the data consumer module.

The data mapping processing function module can convert data of different VES specification versions used by the ONAP to the used VES specification version based on the data type (for example, by increasing or decreasing content of the data).

In this embodiment, a function of processing data that supports VES specifications of different versions may be enhanced, to implement a function of automatically converting VES data into an MV VES specification used by the ONAP when the NE supports MV VES specification data of different versions.

The following uses a process in which the NMS obtains fault information of a network element through a RESTAPI interface in the SDNC, and transmits the fault information to DCAE, to describe the data processing method in this embodiment of this application as an example. This embodiment is for fault management.

Figure 9A:
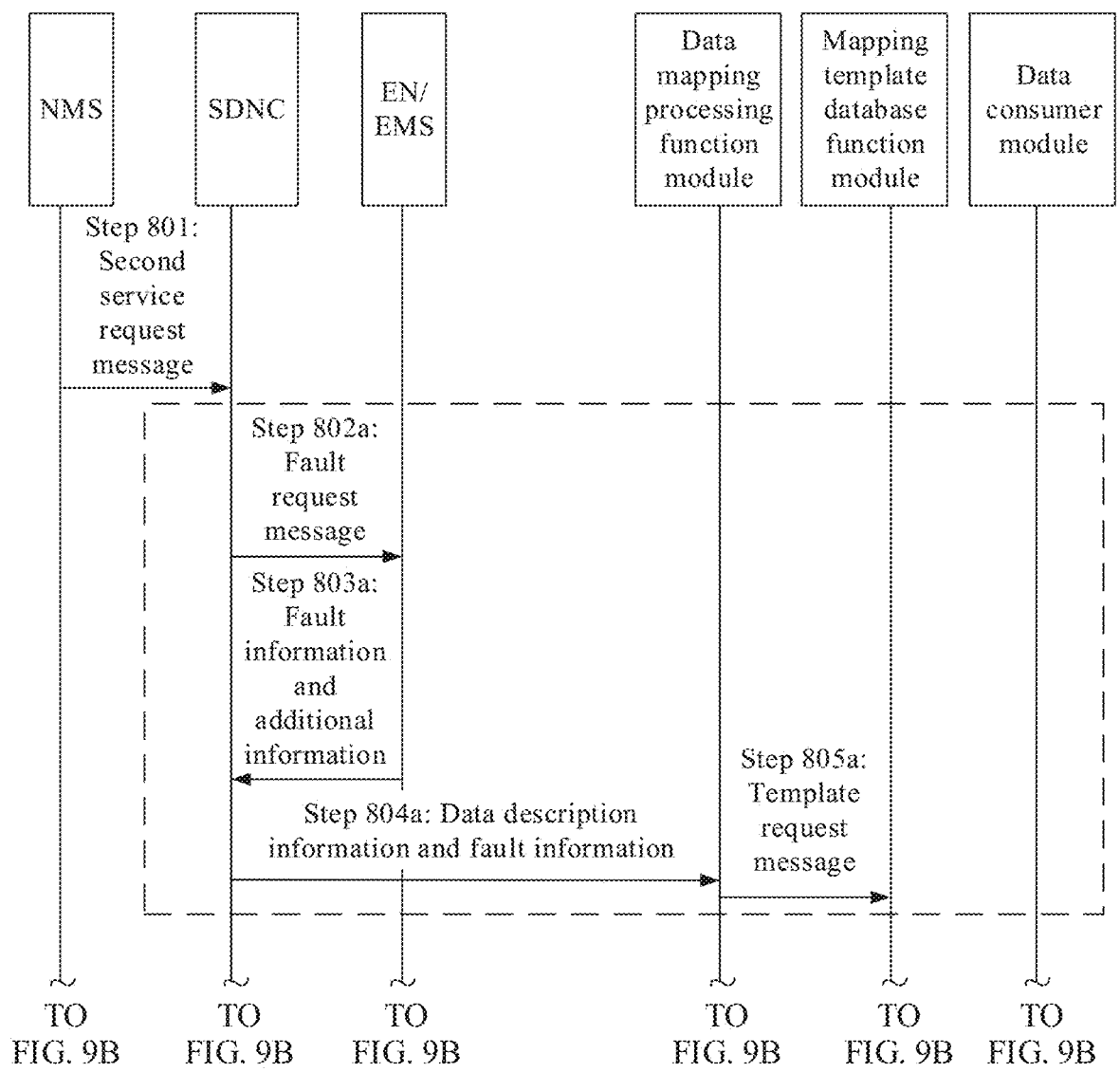
FIG. 9A and FIG. 9B are a flowchart of a data processing method according to an embodiment of this application.
Figure 9B:
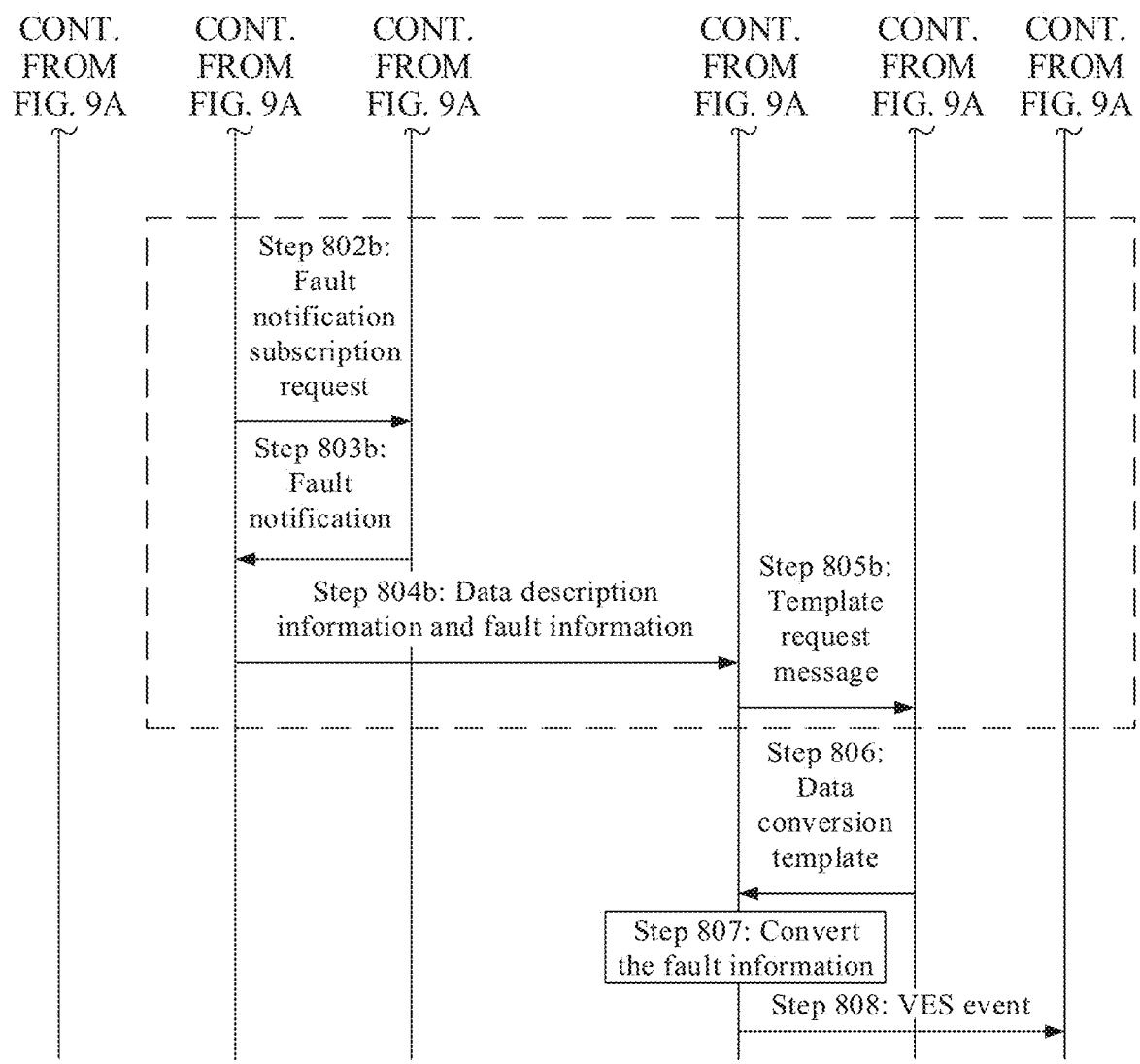

FIG. 9A and FIG. 9B are a flowchart of a data processing method according to an embodiment of this application. As shown in FIG. 9A and FIG. 9B, in this embodiment, an NMS, an SDNC, an EN/EMS, a data mapping processing function module, a mapping template database function module (Mapper catalog), and a data consumer module are provided. The method in this embodiment may include the following steps.

Step 801: The NMS sends a second service request message to the SDNC.

Correspondingly, the SDNC receives the second service request message sent by the NMS. The second service request message is used to create a data collection service. For example, the data collection service may be collecting fault information.

Step 802*a*: The SDNC sends a fault request message to the NE/EMS through a fault list obtaining interface (getAlarmList API).

The fault request message is used to obtain a fault information list, and the fault request message may carry a fault acknowledged state (alarmAckState) and a filter condition (filter). A value range of the fault acknowledged state (alarmAckState) is all faults (allAlarms), all active faults (allActiveAlarms), all active and acknowledged faults (allActiveAndAcknowledgedAlarms), all active and unacknowledged faults (allActiveAndUnacknowledgedAlarms), all cleared and unacknowledged faults (allClearedAndUnacknowledgedAlarms), and all unacknowledged faults (allUnacknowledgedAlarms).

Step 803*a*: The NE/EMS returns fault information (alarmInformation) and additional information (addtionalInfo).

The additional information (addtionalInfo) may include NE information, such as a vendor name and network element version information.

Step 804*a*: The SDNC sends data description information and the fault information to the data mapping processing function module.

The data description information may include the additional information, and a name and a data type of a collector. In this embodiment, the name of the collector is a fault representational state transfer (Representational State Transfer, REST) protocol adapter (Adapter). The FMREST adapter is a function module in the SDNC, and the FMREST adapter indicates that the fault information is obtained through a RestAPI. The data type is a fault (fault).

Step 805a: The data mapping processing function module sends a template request message to the mapping template database function module.

The template request message may include a vendor name, network element version information, and a data type.

Step 802b: The SDNC initiates a fault notification subscription request to the NE/EMS.

The fault notification subscription request includes subscription information, and the subscription information may include a fault notification type. The fault notification type may be a new fault notification (notifyNewAlarm), an acknowledged state changed notification (notifyAckStateChanged), a notifyClearedAlarm (cleared fault notification), a fault rebuilt notification (notifyAlarmListRebuiltAlarm), a fault information changed notification (notifyChangedAlarm), a comment notification (notifyComments), a potential fault list notification (notifyPotentialFaultyAlarmList), a correlated notification changed notification (notifyCorrelatedNotificationChanged), a fault general information changed notification (notifyChangedAlarmGeneral), or the like.

Step 803b: The NE/EMS sends a fault notification to the SDNC based on the subscription information when a fault is generated.

A value range of a notification type of the fault notification is the fault notification type in step 802b. For example, a new fault is generated. The NE/EMS sends a new fault generation notification, and carries a notification type (notificationType), additional information (addtionalInfo), and fault information. The additional information (addtionalInfo) may include NE information, such as the vendor name and the network element version information.

Step 804b: The SDNC sends the data description information and the fault information to the data mapping processing function module.

The data description information may include the additional information, and a name and a data type of a collector. In this embodiment, the name of the collector is a fault representational state transfer (Representational State Transfer, REST) protocol adapter (Adapter). The FMREST adapter is a function module in the SDNC, and the FMREST adapter indicates that the fault information is obtained through a RestAPI. The data type is a fault (fault).

Step 805b: The data mapping processing function module sends a template request message to the mapping template database function module.

The template request message may include a vendor name, network element version information, and a data type.

Step 806: The mapping template database function module sends a data conversion template to the data mapping processing function module.

The data conversion template may be a data conversion template obtained through matching by the mapping template database function module based on the template request message sent in step 805a or step 805b.

Step 807: The data mapping processing function module converts the fault information based on the data conversion template, and fault information obtained through conversion meets a VES specification.

Step 808: The data mapping processing function module sends a VES event to the data consumer module, where the VES event includes the fault information obtained through conversion.

In this embodiment, the fault information from different sources (for example, different vendors, different types of network elements, and different network element versions) may be converted into the data that meets the VES specification, so that the data consumer (for example, an ONAP consumer) module can directly use the reported data obtained through conversion, to improve efficiency of analyzing or using the reported data by the data consumer module.

Figure 10:
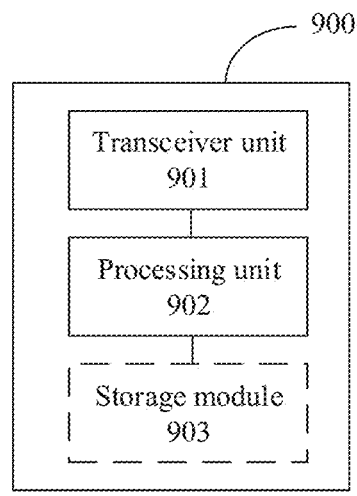
FIG. 10 is a schematic block diagram of a data processing apparatus 900 according to an embodiment of this application.

FIG. 10 is a schematic block diagram of a data processing apparatus 900 according to an embodiment of this application. The data processing apparatus 900 in this embodiment may be used as a data mapping processing function module in the foregoing method embodiments. The data processing apparatus 900 includes a transceiver unit 901 and a processing unit 902.

In an embodiment, the units of the data processing apparatus 900 are configured to perform the following operations and/or processing, respectively.

The transceiver unit 901 is configured to receive data description information and reported data, where the data description information includes at least one of a vendor name, network element version information, a data type supported by a network management, or a coding mode supported by the network management system.

The processing unit 902 is configured to convert the reported data based on the data description information, where reported data obtained through conversion meets a virtual network function event streaming VES specification.

The transceiver unit 901 is further configured to send a VES event, where the VES event includes the reported data obtained through conversion.

In a possible implementation, the data description information and the reported data are from at least one of a collector or a software defined network controller SDNC, and the collector includes at least one of a file collector, a stream collector, an SNMP trap collector, or a VES collector.

In a possible implementation, the transceiver unit 901 is further configured to receive a first message sent by the collector, where the first message includes identification information of the collector, a data type supported by the collector, a coding mode supported by the collector, and an address of the collector. The processing unit 902 is further configured to create a context of the collector based on the first message, where the context includes the identification information of the collector, the data type supported by the collector, the coding mode supported by the collector, and the address of the collector.

In a possible implementation, the transceiver unit 901 is further configured to send a sixth message to the collector, where the sixth message includes the identification information and a registration result of the collector.

In a possible implementation, when the collector is a file collector, a stream collector, or an SNMP trap collector, the processing unit 902 is configured to: determine a corresponding data conversion template based on the data description information, where the data mapping template database function module is configured to convert the reported data into the VES event that complies with the VES specification: and convert the reported data based on the data conversion template.

In a possible implementation, the transceiver unit 901 is further configured to receive a seventh message sent by the SDNC, where the seventh message is used to create, update, or delete the data conversion template.

In a possible implementation, the seventh message includes data template information and at least one of the vendor name, the network element version information, the data type, or the coding mode.

In a possible implementation, the transceiver unit 901 is further configured to: receive a second message sent by the SDNC, where the second message is used to indicate a data collection requirement, the processing unit 902 is further configured to determine, based on the second message and the context, whether the collector that meets the data collection requirement exists; and the transceiver unit 901 is further configured to send a third message to the SDNC, where the third message is used to indicate information about the collector that meets the data collection requirement.

In a possible implementation, the second message includes at least one of a reporting method, the data type supported by the network management system, or the coding mode supported by the network management system.

In a possible implementation, when the collector that meets the data collection requirement is a file collector or a VNF event stream collector, the third message includes the identification information of the collector.

In a possible implementation, when the collector that meets the data collection requirement is a stream collector or an SNMP trap collector, the third message includes at least one of the identification information of the collector or the address of the collector.

In a possible implementation, when the collector is a VES collector, the data description information includes the data type, and the processing unit 902 is configured to add or delete, based on the data type, an element included in the reported data.

In a possible implementation, the reported data includes at least one of file data, stream data, fault data, the VES event, or character data.

Optionally, the data processing apparatus 900 may also have another function of the data mapping processing function module in the method embodiments. For similar description, refer to the foregoing descriptions of the method embodiments. To avoid repetition, details are not described herein again.

Optionally, the processing unit 902 may be a processor, and the transceiver unit 901 may be a transceiver. The transceiver includes a receiver and a transmitter, and has both sending and receiving functions.

Optionally, the processing unit 902 may be a processing apparatus. Some or all functions of the processing apparatus may be implemented by using software.

In a possible implementation, some or all functions of the processing apparatus are implemented by using software. In this case, the processing apparatus may include a memory and a processor. The memory is configured to store a computer program, and the processor reads and executes the computer program stored in the memory, to perform the steps that are implemented inside the data mapping processing function module in the method embodiments.

Optionally, in a possible implementation, the processing apparatus includes a processor. A memory configured to store a computer program is located outside the processing apparatus. The processor is connected to the memory by using a circuit/an electric wire, to read and execute the computer program stored in the memory.

In another embodiment, the data processing apparatus 900 may be a chip. In this case, the transceiver unit 901 may be specifically a communication interface or a transceiver circuit.

This application further provides a computer-readable storage medium. The computer-readable storage medium stores a computer program. When the computer program is executed by a computer, the computer is enabled to perform the steps and/or processing performed by the data mapping processing function module in any one of the foregoing method embodiments.

This application further provides a computer program product. The computer program product includes computer program code. When the computer program code is run on a computer, the computer is enabled to perform the steps and/or processing performed by the data mapping processing function module in any one of the foregoing method embodiments.

This application further provides a chip. The chip includes a processor. A memory configured to store a computer program is disposed independently of the chip, and the processor is configured to execute the computer program stored in the memory, to perform the steps and/or processing performed by the data mapping processing function module in any one of the method embodiments.

Further, the chip may include a memory and a communication interface. The communication interface may be an input/output interface, a pin, an input/output circuit, or the like.

Figure 11:
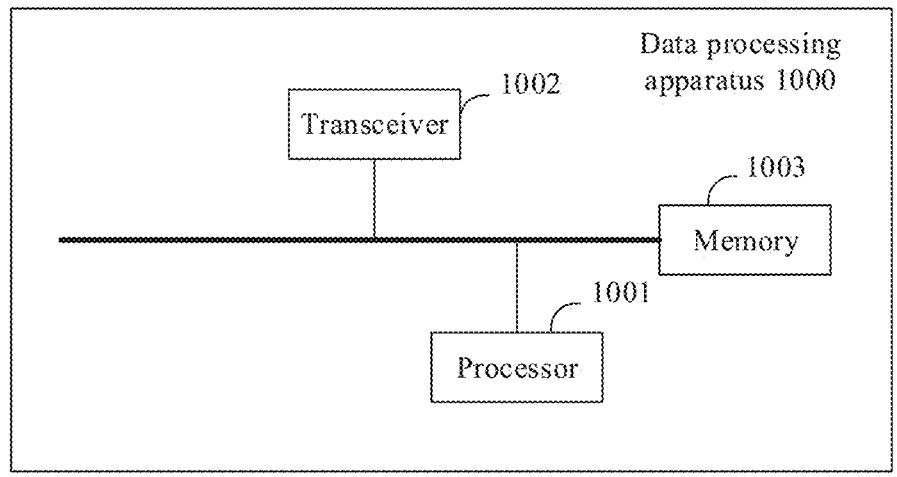
FIG. 11 is a schematic diagram of a structure of a data processing apparatus 1000 according to an embodiment of this application.

FIG. 11 is a schematic diagram of a structure of a data processing apparatus 1000 according to an embodiment of this application. As shown in FIG. 11, the data processing apparatus 1000 may be the data mapping processing function module in the foregoing embodiments. The data processing apparatus 1000 includes a processor 1001 and a transceiver 1002.

Optionally, the data processing apparatus 1000 further includes a memory 1003. The processor 1001, the transceiver 1002, and the memory 1003 may communicate with each other through an internal connection path, to transfer a control signal and/or a data signal.

The memory 1003 is configured to store a computer program. The processor 1001 is configured to execute the computer program stored in the memory 1003, to implement the functions in the foregoing apparatus embodiments.

Optionally, the memory 1003 may alternatively be integrated into the processor 1001, or may be independent of the processor 1001.

The apparatus embodiment may be used to execute the technical solutions of the data mapping processing function module in the method embodiments. Implementation principles and technical effects of the apparatus embodiment are similar to those of the method embodiments, and details are not described herein again.

Figure 12:
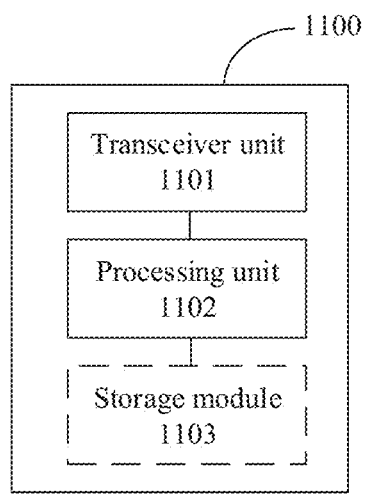
FIG. 12 is a schematic diagram of a structure of a collector 1100 according to an embodiment of this application.

FIG. 12 is a schematic diagram of a structure of a collector 1100 according to an embodiment of this application. The collector 1100 may correspond to the collector in the method embodiments. As shown in FIG. 12, the collector 1100 includes a transceiver unit 1101 and a processing unit 1102.

In an embodiment, the units of the collector 1100 are configured to perform the following operations and/or processing, respectively.

The transceiver unit 1101 is configured to receive data description information.

The processing unit 1102 is configured to send the data description information and reported data to a data mapping processing function module through the transceiver unit 1101, where the data description information includes at least one of a vendor name, network element version information, a data type supported by a network management system, or a coding mode supported by the network management system.

In a possible implementation, the transceiver unit 1101 is further configured to send a first message to the data mapping processing function module, where the first message includes identification information of the collector, a data type supported by the collector, a coding mode supported by the collector, and an address of the collector.

In a possible implementation, the collector 1100 is a file collector, the reported data is file data, and the transceiver unit 1101 is configured to receive a fourth message sent by a software defined network controller SDNC, where the fourth message includes file information and the data description information, and the file information is used to indicate a location of the file data; and the processing unit 1102 is further configured to download, through the transceiver unit 1101, the file data from the corresponding location based on the file information.

In a possible implementation, the collector 1100 is a stream collector, the reported data is stream data, and the transceiver unit 1101 is configured to create a TCP connection to a network element or an element management system; and the processing unit 1102 is further configured to receive the stream data and the data description information through the TCP connection.

In a possible implementation, the collector 1100 is an SNMP trap collector, the reported data is character data, and the transceiver unit 1101 is configured to receive a fifth message sent by an SDNC, where the fifth message includes the data description information and MIB data; the transceiver unit 1101 is further configured to receive fault data sent by a network element or an element management system; and the processing unit 1102 is further configured to decode the fault data into the character data based on the MIB data.

In a possible implementation, the collector 1100 is a VES collector, the reported data is a VES event, and the transceiver unit 1101 is configured to receive the VES event and the data description information that are sent by a network element or an element management system, where the data description information includes the data type supported by the network management system.

Optionally, the processing unit 1102 may be a processor, and the transceiver unit 1101 may be a transceiver. The transceiver includes a receiver and a transmitter, and has both sending and receiving functions.

Optionally, the processing unit 1102 may be a processing apparatus. Some or all functions of the processing apparatus may be implemented by using software.

In a possible implementation, some or all functions of the processing apparatus are implemented by using software. In this case, the processing apparatus may include a memory and a processor. The memory is configured to store a computer program, and the processor reads and executes the computer program stored in the memory, to perform the steps that are implemented inside the collector in the method embodiments.

Optionally, in a possible implementation, the processing apparatus includes a processor. A memory configured to store a computer program is located outside the processing apparatus. The processor is connected to the memory by using a circuit/an electric wire, to read and execute the computer program stored m the memory.

In another embodiment, the collector 1100 may be a chip. In this case, the transceiver unit 1101 may be specifically a communication interface or a transceiver circuit.

This application further provides a computer-readable storage medium. The computer-readable storage medium stores a computer program. When the computer program is executed by a computer, the computer is enabled to perform the steps and/or processing performed by the collector in any one of the foregoing method embodiments.

This application further provides a computer program product. The computer program product includes computer program code. When the computer program code is run on a computer, the computer is enabled to perform the steps and/or processing performed by the collector in any one of the foregoing method embodiments.

This application further provides a chip. The chip includes a processor. A memory configured to store a computer program is disposed independently of the chip, and the processor is configured to execute the computer program stored in the memory, to perform the steps and/or processing performed by the collector in any one of the method embodiments.

Further, the chip may include a memory and a communication interface. The communication interface may be an input/output interface, a pin, an input/output circuit, or the like.

Figure 13:
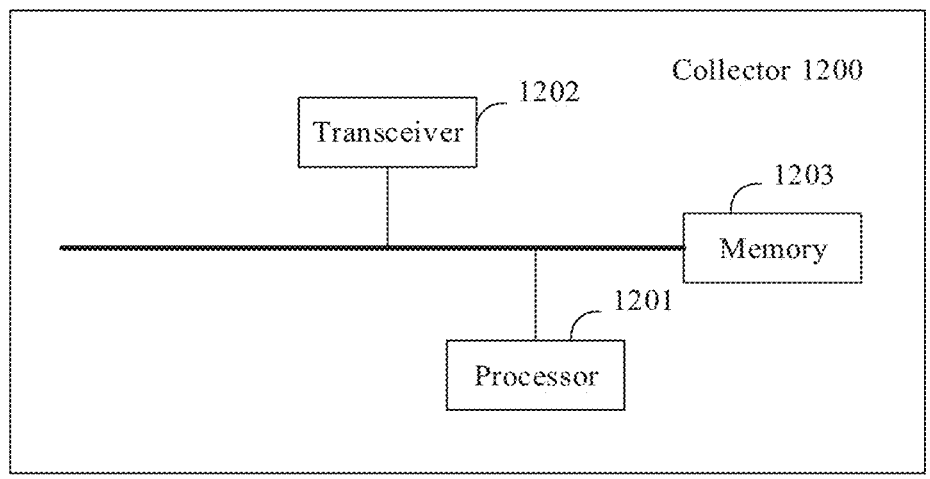
FIG. 13 is a schematic diagram of a structure of a collector 1200 according to an embodiment of this application.

FIG. 13 is a schematic diagram of a structure of a collector 1200 according to an embodiment of this application. As shown in FIG. 13, the collector 1200 may be the collector in the foregoing embodiments. The collector 1200 includes a processor 1201 and a transceiver 1202.

Optionally, the collector 1200 further includes a memory 1203. The processor 1201, the transceiver 1202, and the memory 1203 may communicate with each other through an internal connection path, to transfer a control signal and/or a data signal.

The memory 1203 is configured to store a computer program. The processor 1201 is configured to execute the computer program stored in the memory 1203, to implement the functions in the foregoing apparatus embodiments.

Optionally, the memory 1203 may alternatively be integrated into the processor 1201, or may be independent of the processor 1201.

The apparatus embodiment may be used to execute the technical solutions of the collector in the method embodiments. Implementation principles and technical effects of the apparatus embodiment are similar to those of the method embodiments, and details are not described herein again.

Figure 14:
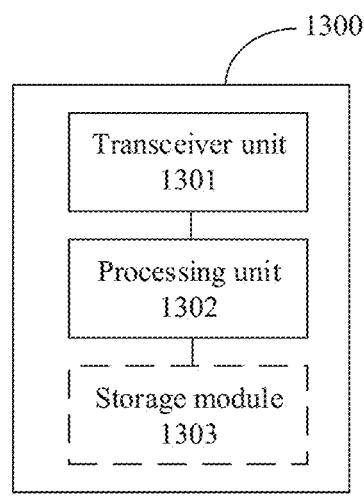
FIG. 14 is a schematic diagram of a structure of a data processing apparatus 1300 according to an embodiment of this application.

FIG. 14 is a schematic diagram of a structure of a data processing apparatus 1300 according to an embodiment of this application. The data processing apparatus 1300 may correspond to the network element or the element management system in the method embodiments. As shown in FIG. 14, the data processing apparatus 1300 includes a transceiver unit 1301 and a processing unit 1302.

In an embodiment, the units of the data processing apparatus 1300 are configured to perform the following operations and/or processing, respectively.

The transceiver unit 1301 is configured to receive a data collection request message sent by a software defined network controller SDNC, where the data collection request message includes at least one of a reporting method, a collection granularity period, a data type supported by a network management system, or a coding mode supported by the network management system.

The processing unit 1302 is configured to collect at least one of file data, stream data, fault data, a VES event, or character data based on the data collection request message.

In a possible implementation, the processing unit 1302 is further configured to: create a TCP connection to a stream collector through the transceiver unit 1301; and send the stream data and data description information to the stream collector through the TCP connection, where the data description information includes at least one of a vendor name, network element version information, the data type supported by the network management system, or the coding mode supported by the network management system.

In a possible implementation, the transceiver unit 1301 is further configured to send MIB data to the SDNC, where the MIB data is used to decode the fault data.

In a possible implementation, the transceiver unit 1301 is further configured to send the data type supported by the network management system and the VES event to a VES collector.

Optionally, the processing unit 1302 may be a processor, and the transceiver unit 1301 may be a transceiver. The transceiver includes a receiver and a transmitter, and has both sending and receiving functions.

Optionally, the processing unit 1302 may be a processing apparatus. Some or all functions of the processing apparatus may be implemented by using software.

In a possible implementation, some or all functions of the processing apparatus are implemented by using software. In this case, the processing apparatus may include a memory and a processor. The memory is configured to store a computer program, and the processor reads and executes the computer program stored in the memory, to perform the steps that are implemented inside the network element or the element management system in the method embodiments.

Optionally, in a possible implementation, the processing apparatus includes a processor. A memory configured to store a computer program is located outside the processing apparatus. The processor is connected to the memory by using a circuit/an electric wire, to read and execute the computer program stored in the memory.

In another embodiment, the data processing apparatus 1300 may be a chip. In this case, the transceiver unit 1301 may be specifically a communication interface or a transceiver circuit.

This application further provides a computer-readable storage medium. The computer-readable storage medium stores a computer program. When the computer program is executed by a computer, the computer is enabled to perform the steps and/or processing performed by the network element or the element management system in any one of the foregoing method embodiments.

This application further provides a computer program product. The computer program product includes computer program code. When the computer program code is run on a computer, the computer is enabled to perform the steps and/or processing performed by the network element or the element management system in any one of the foregoing method embodiments.

This application further provides a chip. The chip includes a processor. A memory configured to store a computer program is disposed independently of the chip, and the processor is configured to execute the computer program stored in the memory, to perform the steps and/or processing performed by the network element or the element management system in any one of the method embodiments.

Further, the chip may include a memory and a communication interface. The communication interface may be an input/output interface, a pin, an input/output circuit, or the like.

Figure 15:
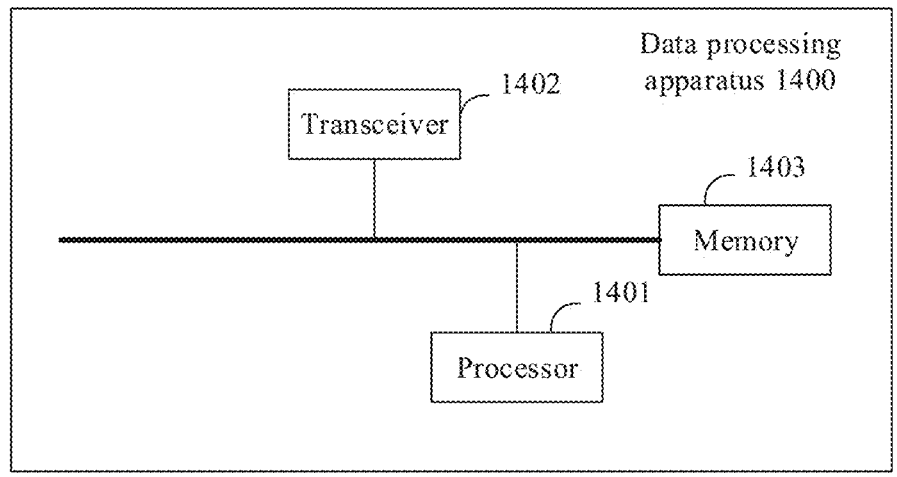
FIG. 15 is a schematic diagram of a structure of a data processing apparatus 1400 according to an embodiment of this application.

FIG. 15 is a schematic diagram of a structure of a data processing apparatus 1400 according to an embodiment of this application. The data processing apparatus 1400 may correspond to the network element or the element management system in the method embodiments. The data processing apparatus 1400 includes a processor 1401 and a transceiver 1402.

Optionally, the data processing apparatus 1400 further includes a memory 1403. The processor 1401, the transceiver 1402, and the memory 1403 may communicate with each other through an internal connection path, to transfer a control signal and/or a data signal.

The memory 1403 is configured to store a computer program. The processor 1401 is configured to execute the computer program stored in the memory 1403, to implement the functions in the foregoing apparatus embodiments.

Optionally, the memory 1403 may alternatively be integrated into the processor 1401, or may be independent of the processor 1401.

The apparatus embodiment may be used to execute the technical solutions of the network element or the element management system in the method embodiments. Implementation principles and technical effects of the apparatus embodiment are similar to those of the method embodiments, and details are not described herein again.

An embodiment of this application further provides a network element or an element management system. The network element or the element management system uses a structure the same as that in FIG. 14. A transceiver unit is configured to receive a first capability negotiation message sent by a software defined network controller SDNC, where the first capability negotiation message is used to trigger the network element or the element management system to feed back whether the network element or the element management system supports at least one of a reporting method, a data type, or a coding mode of a network management system. A processing unit is configured to send a feedback result to the SDNC through the transceiver unit, where the feedback result is used to indicate whether at least one of the reporting method, the data type, or the coding mode of the network management system is supported.

In some embodiments, the first capability negotiation message includes the reporting method, the data type, the coding mode, and an object list, the object list is used to indicate at least one network element, and the element management system is configured to manage one or more of the at least one network element; and the processing unit is further configured to parse the object list to obtain identification information, and obtain, based on the identification information, whether the network element or the element management system supports the reporting method, the data type, and the coding mode of the network management system.

Figure 16:
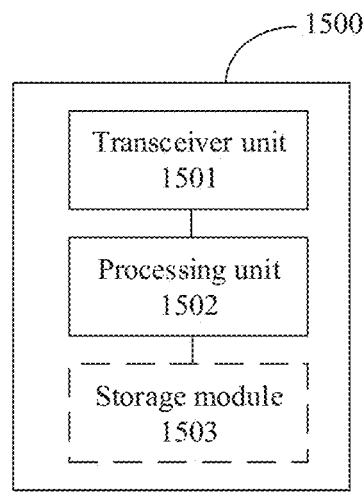
FIG. 16 is a schematic diagram of a structure of a software defined network controller 1500 according to an embodiment of this application.

FIG. 16 is a schematic diagram of a structure of a software defined network controller 1500 according to an embodiment of this application. The software defined network controller 1500 may correspond to the SDNC in the method embodiments. As shown in FIG. 16, the software defined network controller 1500 includes a transceiver unit 1501 and a processing unit 1502.

In an embodiment, the units of the software defined network controller 1500 are configured to perform the following operations and/or processing, respectively.

The transceiver unit 1501 is configured to receive a service request message sent by a network management system, where the service request message includes a data type supported by the network management system and a coding mode supported by the network management system.

The transceiver unit 1501 is further configured to send a first capability negotiation message to a network element or an element management system, where the first capability negotiation message is used to trigger the network element or the element management system to feed back whether the network element or the element management system supports the data type and the coding mode.

The processing unit 1502 is configured to send a data collection request message to the network element or the element management system based on a feedback of the network element or the element management system through the transceiver unit 1501.

In a possible implementation, the service request message further includes an object list, the first capability negotiation message includes the data type, the coding mode, and the object list, the object list is used to indicate at least one network element, and the element management system is configured to manage one or more of the at least one network element.

In a possible implementation, the service request message further includes an object list, the object list is used to indicate at least one network element, the element management system is configured to manage one or more of the at least one network element, and the processing unit 1502 is further configured to parse the object list to obtain identification information; and the processing unit 1502 is further configured to send, through the transceiver unit 1501, the first capability negotiation message to the network element or the element management system corresponding to the identification information.

Optionally, the processing unit 1502 may be a processor, and the transceiver unit 1501 may be a transceiver. The transceiver includes a receiver and a transmitter, and has both sending and receiving functions.

Optionally, the processing unit 1502 may be a processing apparatus. Some or all functions of the processing apparatus may be implemented by using software.

In a possible implementation, some or all functions of the processing apparatus are implemented by using software. In this case, the processing apparatus may include a memory and a processor. The memory is configured to store a computer program, and the processor reads and executes the computer program stored in the memory, to perform the steps that are implemented inside the SDNC in the method embodiments.

Optionally, in a possible implementation, the processing apparatus includes a processor. A memory configured to store a computer program is located outside the processing apparatus. The processor is connected to the memory by using a circuit/an electric wire, to read and execute the computer program stored in the memory.

In another embodiment, the software defined network controller 1500 may be a chip. In this case, the transceiver unit 1501 may be specifically a communication interface or a transceiver circuit.

This application further provides a computer-readable storage medium. The computer-readable storage medium stores a computer program. When the computer program is executed by a computer, the computer is enabled to perform the steps and/or processing performed by the SDNC in any one of the foregoing method embodiments.

This application further provides a computer program product. The computer program product includes computer program code. When the computer program code is run on a computer, the computer is enabled to perform the steps and/or processing performed by the SDNC in any one of the foregoing method embodiments.

This application further provides a chip. The chip includes a processor. A memory configured to store a computer program is disposed independently of the chip, and the processor is configured to execute the computer program stored in the memory, to perform the steps and/or processing performed by the SDNC in any one of the method embodiments.

Further, the chip may include a memory and a communication interface. The communication interface may be an input/output interface, a pin, an input/output circuit, or the like.

Figure 17:
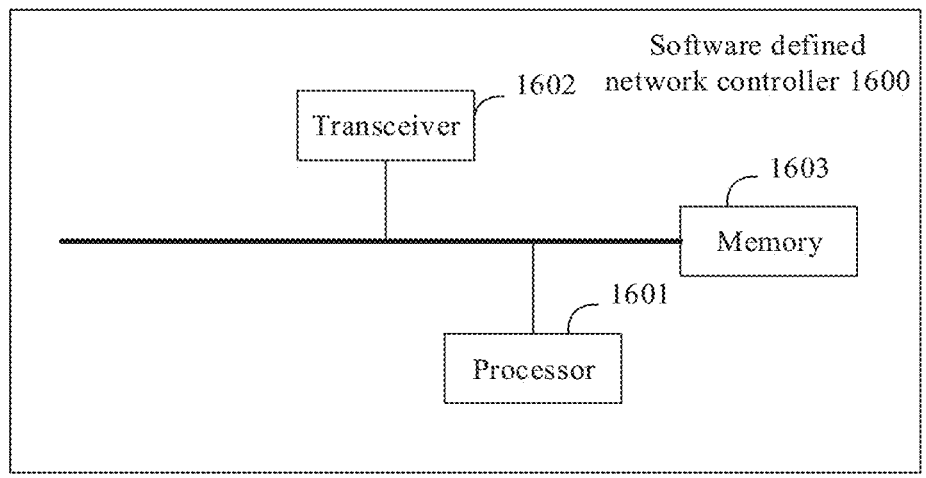
FIG. 17 is a schematic diagram of a structure of a software defined network controller 1600 according to an embodiment of this application.

FIG. 17 is a schematic diagram of a structure of a software defined network controller 1600 according to an embodiment of this application. The software defined network controller 1600 may correspond to the SDNC in the method embodiments. The software defined network controller 1600 includes a processor 1601 and a transceiver 1602.

Optionally, the software defined network controller 1600 further includes a memory 1603. The processor 1601, the transceiver 1602, and the memory 1603 may communicate with each other through an internal connection path, to transfer a control signal and/or a data signal.

The memory 1603 is configured to store a computer program. The processor 1601 is configured to execute the computer program stored in the memory 1603, to implement the functions in the foregoing apparatus embodiment.

Optionally, the memory 1603 may alternatively be integrated into the processor 1601, or may be independent of the processor 1601.

The apparatus embodiment may be used to execute the technical solutions of the SDNC in the method embodiments. Implementation principles and technical effects of the apparatus embodiment are similar to those of the method embodiments, and details are not described herein again.

The processor described in the foregoing embodiments may be an integrated circuit chip and has a signal processing capability. In an implementation process, steps in the foregoing method embodiments may be implemented by using a hardware integrated logic circuit in the processor or an instruction in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic component, a discrete gate or a transistor logic device, or a discrete hardware component. The general-purpose processor may be a microprocessor, or the processor may be any conventional processor or the like. The steps of the methods disclosed in embodiments of this application may be directly executed and completed by using a hardware encoding processor, or may be executed and completed by using a combination of hardware and software modules in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

The memory in the foregoing embodiments may be a volatile memory or a non-volatile memory, or may include both the volatile memory and the non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that memories in the system and method described in this specification include but are not limited to the memories and memories of any other proper types.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, the apparatus, and the method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, they may be located in one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computer device (which is a personal computer, a server, or a network device) to perform all or some of the steps of the methods described in embodiments of this application. The storage medium includes any medium that can store program code such as a USB flash drive, a removable hard disk, a read-only memory (read-only memory, ROM), a random access memory (random access memory, RAM), a magnetic disk, or an optical disc.

What is claimed is:
1. A data processing method, comprising:
receiving a first message sent by a collector, wherein the first message comprises identification information of the collector, a data type supported by the collector, a coding mode supported by the collector, and an address of the collector;
creating a context of the collector based on the first message, wherein the context comprises the identification information of the collector, the data type supported by the collector, the coding mode supported by the collector, and the address of the collector;
receiving a second message, wherein the second message is used to indicate a data collection requirement;
determining, based on a locally stored context of each collector and the second message, a collector that supports a data type and coding mode in the second message, wherein a context of the collector comprises attribute capability information of the collector;
receiving data description information and reported data from the determined collector that supports the data type and coding mode in the second message, wherein the data description information comprises at least one of a vendor name, network element version information, a data type supported by a network management system, or a coding mode supported by the network management system;
converting the reported data based on the data description information, wherein reported data obtained through conversion meets a virtual network function event streaming (VES) specification; and
sending a VES event, wherein the VES event comprises the reported data obtained through conversion.

2. The data processing method according to claim 1, wherein the converting the reported data based on the data description information comprises:
determining a data conversion template based on the data description information; and
converting the reported data based on the data conversion template.

3. The data processing method according to claim 1, wherein the data processing method further comprises:
sending a third message to a software defined network controller (SDNC), wherein the third message is used to indicate information about the collector that meets the data collection requirement.

4. The data processing method according to claim 3, wherein:
when the collector that meets the data collection requirement is a file collector or a virtual network function (VNF) event stream collector, the third message comprises the identification information of the collector; or
when the collector that meets the data collection requirement is a stream collector or a simple network management protocol (SNMP) trap collector, the third message comprises at least one of the identification information of the collector or the address of the collector.

5. A data processing method, comprising:
sending, by a collector, a first message to a data mapping processing function module, wherein the first message comprises identification information of the collector, a data type supported by the collector, a coding mode supported by the collector, and an address of the collector;
receiving, by the collector, data description information; and
sending, by the collector, the data description information and reported data to the data mapping processing function module, wherein the data description information comprises at least one of a vendor name, network element version information, a data type supported by a network management system, or a coding mode supported by the network management system;
wherein the collector is determined, based on a locally stored context of each collector and a second message, to support a data type and a coding mode in the second message received by the data mapping processing function module, wherein the second message indicates a data collection requirement, and wherein a third message is sent by the data mapping processing function module to a software defined network controller (SDNC) to indicate information about the collector that meets a data collection requirement.

6. The data processing method according to claim 5, wherein:
the collector is a file collector, the reported data is file data, and the receiving, by a collector, data description information comprises:
receiving, by the file collector, a fourth message sent by a software defined network controller (SDNC), wherein the fourth message comprises file information and the data description information, and the file information is used to indicate a location of the file data; and
downloading, by the file collector, the file data from the location of the file data based on the file information; or
the collector is a stream collector, the reported data is stream data, and the receiving, by a collector, data description information comprises:
creating, by the stream collector, a transmission control protocol (TCP) connection to a network element or an element management system; and
receiving, by the stream collector, the stream data and the data description information through the TCP connection; or
the collector is a simple network management protocol (SNMP) trap collector, the reported data is character data, and the receiving, by a collector, data description information comprises:
receiving, by the SNMP trap collector, a fifth message sent by an SDNC, wherein the fifth message comprises the data description information and management information base (MIB) data;
receiving, by the SNMP trap collector, fault data sent by a network element or an element management system; and
decoding, by the SNMP trap collector, the fault data into the character data based on the MIB data; or the collector is a virtual network function event streaming (VES) collector, the reported data is a VES event, and the receiving, by a collector, data description information comprises:
receiving, by the VES collector, the VES event and the data description information that are sent by a network element or an element management system, wherein the data description information comprises the data type supported by the network management system.

7. An apparatus, comprising:
at least one processor coupled to one or more memories; and
the one or more memories coupled to the at least one processor and storing program instructions for execution by the at least one processor to:
receive a first message sent by a collector, wherein the first message comprises identification information of the collector, a data type supported by the collector, a coding mode supported by the collector, and an address of the collector;
create a context of the collector based on the first message, wherein the context comprises the identification information of the collector, the data type supported by the collector, the coding mode supported by the collector, and the address of the collector;
receive a second message, wherein the second message is used to indicate a data collection requirement;
determine, based on a locally stored context of each collector and the second message, a collector that supports a data type and coding mode in the second message, wherein a context of the collector comprises attribute capability information of the collector;
receive data description information and reported data from the determined collector that supports the data type and coding mode in the second message, wherein the data description information comprises at least one of a vendor name, network element version information, a data type supported by a network management system, or a coding mode supported by the network management system;
convert the reported data based on the data description information, wherein reported data obtained through conversion meets a virtual network function event streaming (VES) specification; and
send a VES event, wherein the VES event comprises the reported data obtained through conversion.

8. The apparatus according to claim 7, wherein converting the reported data based on the data description information comprises:
determining a data conversion template based on the data description information; and
converting the reported data based on the data conversion template.

9. The apparatus according to claim 7, wherein the one or more memories store the program instructions for execution by the at least one processor to:
send a third message to a software defined network controller (SDNC), wherein the third message is used to indicate information about the collector that meets the data collection requirement.

10. The apparatus according to claim 9, wherein:
when the collector that meets the data collection requirement is a file collector or a virtual network function (VNF) event stream collector, the third message comprises the identification information of the collector; or when the collector that meets the data collection requirement is a stream collector or a simple network management protocol (SNMP) trap collector, the third message comprises at least one of the identification information of the collector or the address of the collector.

11. An apparatus, comprising:
at least one processor coupled to one or more memories; and
the one or more memories coupled to the at least one processor and storing program instructions for execution by the at least one processor to:
send a first message to a data mapping processing function module, wherein the first message comprises identification information of a collector, a data type supported by the collector, a coding mode supported by the collector, and an address of the collector;
receive data description information; and
send the data description information and reported data to the data mapping processing function module, wherein the data description information comprises at least one of a vendor name, network element version information, a data type supported by a network management system, or a coding mode supported by the network management system, wherein the collector is determined based on a locally stored context of each collector and a second message, wherein the collector is configured to support a data type and coding mode in the second message received by the data mapping processing function module, wherein the second message indicates a data collection requirement, and wherein a third message is sent by the data mapping processing function module to a software defined network controller (SDNC) to indicate information about the collector that meets a data collection requirement.

12. The apparatus according to claim 11, wherein the collector is a file collector, the reported data is file data, and the receiving data description information comprises:
receiving a fourth message sent by a software defined network controller (SDNC), wherein the fourth message comprises file information and the data description information, and the file information is used to indicate a location of the file data; and
downloading the file data from the location of the file data based on the file information.

13. The apparatus according to claim 11, wherein the collector is a stream collector, the reported data is stream data, and the receiving data description information comprises:
creating a transmission control protocol (TCP) connection to a network element or an element management system; and
receiving the stream data and the data description information through the TCP connection.

14. The apparatus according to claim 11, the collector is a simple network management protocol (SNMP) trap collector, the reported data is character data, and the receive data description information comprises:
receiving a fifth message sent by an SDNC, wherein the fifth message comprises the data description information and management information base (MIB) data;
receiving fault data sent by a network element or an element management system; and
decoding the fault data into the character data based on the MIB data.

\* \* \* \* \*